United States Patent
Hirokawa et al.

(10) Patent No.: US 6,532,160 B2
(45) Date of Patent: Mar. 11, 2003

(54) SWITCHING POWER SUPPLY

(75) Inventors: Masahiko Hirokawa, Tokyo (JP); Yasuhiro Murai, Tokyo (JP); Tomomi Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/885,419

(22) Filed: Jan. 3, 2002

(65) Prior Publication Data

US 2002/0136033 A1 Sep. 26, 2002

Related U.S. Application Data

(63) Continuation of application No. PCT/JP00/03681, filed on Jun. 7, 2000.

(30) Foreign Application Priority Data

Jun. 22, 1999 (JP) .............................. 11-176026
Dec. 16, 1999 (JP) .............................. 11-358011

(51) Int. Cl.$^7$ .............................................. H02H 7/125
(52) U.S. Cl. ......................... 363/52; 363/56.12; 363/88
(58) Field of Search ............................. 363/50, 52, 53, 363/56.12, 44, 45, 88, 90, 125, 126

(56) References Cited

U.S. PATENT DOCUMENTS

| 5,414,613 A | * | 5/1995 | Chen | 363/52 |
| 5,898,581 A | * | 4/1999 | Liu | 363/53 |
| 5,943,224 A | * | 8/1999 | Mao | 363/52 |

FOREIGN PATENT DOCUMENTS

| JP | 4-271275 | 9/1992 |
| JP | 5-260739 | 10/1993 |
| JP | 6-54531 | 2/1994 |

OTHER PUBLICATIONS

"Novel Zero–Voltage and Zero–Current Switching (ZVZCS) Full Bridge PWM Converter Using a Simple Auxiliary Circuit", Jung G. Cho et al., Thirteenth Applied Power Electronics Conference and Exposition, 1998, Section 18.5, pp. 834–839 (No month).

* cited by examiner

Primary Examiner—Jessica Han
(74) Attorney, Agent, or Firm—Cohen, Pontani, Lieberman & Pavane

(57) ABSTRACT

A switching power supply comprises a transformer 3, a switching circuit 1, an output rectifier circuit, an output smoothing circuit, and a snubber circuit. A snubber capacitor 17 has one terminal connected to the one terminal of a snubber diode 19. The other end of the snubber capacitor is led to an output winding 4 of the transformer, while the other terminal of the snubber diode is led to the other of the electrode of an output rectifier diode 7. A snubber inductor 23 has one end connected to the connecting point of the snubber capacitor and the snubber diode, and the other end is. connected to the input side of the output smoothing circuit. The polarity of the diode is arranged to establish a charging loop circulating through the snubber diode, the snubber capacitor and the output winding of the transformer, so as to provide a reduced loss, in a cycle in which the voltage appearing at the output winding of the transformer is the reverse direction to the output rectifier diode.

22 Claims, 28 Drawing Sheets

SWITCHING POWER SUPPLY

This application is a continuation of International Application PCT/JP00/03681 (not published in English) filed Jun. 7, 2000.

TECHNICAL FIELD

The present invention relates to a switching power supply. In particular, the present invention relates to a switching power supply having a transformer which includes an input winding and an output winding, wherein a DC input voltage supplied to the input winding of the transformer is switched by a switching circuit.

BACKGROUND ART

Heretofore, various types of switching power supplies have been proposed and put to practical use. In a dominant type among them, an inputted DC voltage is switched by a switching operation of a switching circuit connected to an input winding of a power conversion transformer and the resulting switching output is taken out to an output winding of the power conversion transformer. A voltage appearing at the output winding based on the switching operation of the switching circuit is rectified by a rectifier circuit and then converted into DC by a smoothing circuit to be output.

In the switching power supply, an output rectifier diode is connected in series with a power transfer line. Thus, reducing the loss arising from this output rectifier diode may effectively contribute to an enhanced efficiency of the switching power supply.

The reduced loss of the output rectifier diode may be simply obtained by use of a diode having a low forward voltage drop. However, the diode having a low forward voltage drop involves in an insufficiently low reverse withstand voltage. Thus, particularly when the diode having a low forward voltage drop is used as the output rectifier diode, it is necessary to restrain the reverse voltage.

In this kind of switching power supplies, a most important consideration on the reverse voltage is a surge voltage arising from parasitic elements based on the switching operation of the switching circuit. The surge voltage is applied as a reverse voltage to the output rectifier diode. A snubber circuit has been known as means for restraining the surge voltage applied to the output rectifier diode. One conventional snubber circuit is described in FIG. 3 of Japanese Patent Laid-Open Publication No. Hei 6-54531 as a prior art. This known snubber circuit comprises a series circuit of a capacitor and a resistance wherein the series circuit is connected in parallel with an output rectifier diode. In order to restrain the surge voltage, this snubber circuit is adapted to consume unnecessary energy including the surge voltage by the resistance through the capacitor.

However, this conventional snubber circuit may not sufficiently restrain the surge voltage applied to the output rectifier diode when it is turned off. Thus, it is undesirably forced to use an output rectifier diode having a high withstand voltage. In addition, since the conventional snubber circuit is configured to consume the energy of the surge voltage by the resistance, an associated resistor is increased in size, resulting in undesirable heat and power loss in the resistor. Thus, this conventional snubber circuit involves a drawback in achieving a downsized and highly efficient switching power supply.

The aforementioned Japanese Patent Laid-Open Publication No. Hei 6-54531 also shows a snubber circuit using no resistor in FIG. 1 thereof. This snubber circuit disclosed in this Patent Laid-Open Publication comprises a series circuit composed of a capacitor and a diode and connected to both ends of an output rectifier diode, and an inductor connected between a connection point, at which the capacitor is connected to the diode, and an output side of an output smoothing choke coil. According to the snubber circuit having the above construction, unnecessary surge energy may be absorbed by the capacitor, and the absorbed energy may be regenerated at the output side of the switching power supply through the inductor.

However, in the aforementioned conventional snubber circuit, one end of the inductor is connected to the output side of the choke coil. Accordingly, the series circuit composed of the diode in the snubber circuit and the inductor is connected in parallel with the output smoothing choke coil. Thus, when the switching circuit is turned on, the current rectified by the rectifier circuit flows into not only the choke coil but also the diode of the snubber circuit and the inductor which are connected in parallel with the choke coil. This causes the loss due to a forward voltage drop in the diode of the switching circuit and the loss due to the DC resistance of the inductor. Further, this Patent Laid-Open Publication discloses the technique applicable only for single-diode type forward converter, and does not disclose any application to the switching power supply having a center tap type rectifier circuit. Assuming that the technique described in this prior art is employed in the switching power supply having a center tap type rectifier circuit as-is with departing from the disclosure therein, the demand for downsizing may not be satisfied due to the resultingly increased number of components.

DISCLOSURE OF THE INVENTION

It is an object of the present invention to provide a switching power supply having an enhanced efficiency yielded by reducing the loss due to a diode and inductor which form a snubber circuit.

It is another object of the present invention to provide a switching power supply capable of employing a small size, low power element to form a snubber circuit.

It is still another object of the present invention to provide a highly efficient, low noise, small size switching power supply, in a switching power supply having a center tap type rectifier circuit.

It is yet another object of the present invention to provide a highly efficient switching power supply capable of employing an output rectifier diode having a low forward voltage drop, in a switching power supply having a center tap type rectifier circuit.

It is yet still another object of the present invention to provide a switching power supply including a highly efficient, low noise snubber circuit capable of sufficiently restraining a surge voltage applied to a output rectifier diode, in a switching power supply having a center tap type rectifier circuit.

It is another further object of the present invention to provide a switching power supply including a low-energy-consumption, highly efficient snubber circuit, in a switching power supply having a center tap type rectifier circuit.

It is still a further object of the present invention to provide a highly efficient switching power supply having a snubber circuit capable of regenerating energy, in a switching power supply having a center tap type rectifier circuit.

It is additional object of the present invention to provide a small size switching power supply having a small number of components, in a switching power supply having a center tap type rectifier circuit.

In order to achieve the above and other objects, according to the present invention, there is provided a switching power supply comprising a transformer, a switching circuit, an output rectifier circuit, an output smoothing circuit, and a snubber circuit. The transformer includes an input winding and an output winding. The switching circuit switches a DC input voltage supplied through the input winding of the transformer. The output rectifier circuit includes at least one output rectifier diode. One electrode of the output rectifier diode is connected to one end of the output winding of the transformer. The input side of the output smoothing circuit is connected to the other electrode of the output rectifier diode.

The snubber circuit includes a snubber capacitor, a snubber diode, and a snubber inductor. The snubber capacitor and the snubber diode are connected with each other at each one end thereof. The other end of the snubber capacitor is led to the output winding, while the other end of the snubber diode is led to the other of the electrode of the output rectifier diode. One end of the snubber inductor is connected to a connection point between the snubber capacitor and the snubber diode, while the other end of the snubber inductor is connected to the input side of the output smoothing circuit.

In the aforementioned switching power supply according to the present invention, the switching circuit switches the DC input voltage supplied to the input winding of the transformer. The switching output is taken out on the side of the output winding of the transformer. The output rectifier circuit rectifies a voltage generated at the output winding of the transformer to provide an output. The output smoothing circuit smoothes the rectified output from the output rectifier circuit to provide an output. As a result, the switching output transferred to the output winding based on the switching operation of the switching circuit is rectified by the output rectifier circuit and then smoothed by the output smoothing circuit.

In a cycle in which the voltage appearing at the output winding of the transformer based on the switching operation of the switching circuit is the reverse direction to the output rectifier diode, the diode of the snubber circuit is arranged to have a polarity to form a charging loop circulating through the diode and capacitor provided in the snubber circuit, and the output winding of the transformer.

In this charging loop, an LC resonance circuit composed of the capacitor of the snubber circuit and a series inductance including a leakage inductance of the transformer and wirings is established, and thereby the terminal voltage in the capacitor of the snubber circuit is increased in accordance with a waveform of a LC resonance voltage. Thus, the surge voltage applied to the output rectifier diode is restrained in the voltage determined by the LC resonance voltage.

As described above, the present invention may restrain the surge voltage applied to the output rectifier diode so that a diode having a low forward voltage drop may be used as the output rectifier diode. Thus, the loss due to the output rectifier diode is reduced and thereby a low-energy-consumption, a highly efficient switching power supply may be obtained. In addition, since the surge voltage applied to the output rectifier diode is restrained by the LC resonance effect, a low noise snubber circuit may be achieved.

In the cycle in which the voltage appearing at the output winding of the transformer is the forward direction to the output rectifier diode based on the switching operation of the switching circuit, a discharge path to the snubber capacitor is established in the snubber circuit. This discharge path serves as a circuit for discharging the energy accumulated in the snubber capacitor through the snubber inductor. Since the snubber inductor is connected between the line, which connects the snubber capacitor with the snubber diode, and the input side of the output smoothing circuit, the energy accumulated in the capacitor is regenerated to the input side of the output smoothing circuit through the snubber inductor, which may provide an increased efficiency.

One important feature of the present invention is that the snubber inductor is connected between the line, which connects the snubber capacitor with the snubber diode, and the input side of the output smoothing circuit. According to this structure, the snubber inductor is never arranged in parallel with a choke coil of the output smoothing circuit. Further, the other end of the snubber diode in the snubber circuit is led to one electrode of the output rectifier diode connected to the input side of the output smoothing circuit. This brings both ends of the series circuit of the snubber diode and the snubber inductor into an electrically connected state, or a short-circuited state, at the input side of the output smoothing circuit. Thus, in the cycle in which the voltage appearing at the output winding of the transformer is the forward direction to the output rectifier diode based on the switching operation of the switching circuit, the current passing through the diode and inductor of the snubber circuit becomes extremely small. Thus, the loss due to the forward voltage drop in the diode and the loss due to the DC resistance of the snubber inductor in the snubber circuit are decreased to the extent that they may be substantially negligible.

As described above, since the current passing through the diode and inductor of the snubber circuit become extremely small, a low capacity, low power element may be used as the diode and inductor of the snubber circuit. As a result, the diode and inductor of the snubber circuit may be downsized, and thereby a smaller size switching power supply may be provided.

In another embodiment of the present invention, a switching power supply comprises a transformer including an input winding, an output winding and a center tap provided at the output winding, a switching circuit connected to the input winding of the transformer and switching a DC input voltage supplied to the input winding, a first output rectifier diode having one end connected to one end of the transformer, and a second output rectifier diode having one end which has the same polarity as that of the one end of the first output rectifier diode and is connected to the other end of the transformer, an output rectifier circuit in which the other end of the first output rectifier diode and the other end of the second output rectifier diode, which have the same polarity respectively, are connected with each other, an output smoothing circuit having an input side, which is connected to a connection point between the first and second output rectifier diodes and the center tap of the transformer, and an output side led to a pair of output terminals, and a snubber circuit. The snubber circuit includes a first snubber circuit, a second snubber circuit, and a snubber inductor. The first snubber circuit includes a first snubber capacitor and a first snubber diode, wherein the first snubber capacitor and the first snubber diode are connected in series with each other to form a series circuit. The series circuit is connected in parallel with the second output rectifier diode so as to allow the first snubber diode to have a reverse polarity to the second output rectifier diode. The second snubber circuit includes a second snubber capacitor and a second snubber diode, wherein the second snubber capacitor and the second snubber diode are connected in series with each other to form a series circuit. The series circuit is connected in parallel with the first output rectifier diode so as to allow the second snubber diode to have a reverse polarity to the first output rectifier diode. The snubber inductor having one end connected to the output side of the smoothing circuit and the other end led to the first and second snubber circuits to form a one-way discharging path for the first and second capacitors.

The first and second snubber circuits are different only in each operation timing but have substantially the same structure and operation respectively. In the cycle in which the voltage appearing at the output winding of the transformer is the forward direction to the first output rectifier diode based on the switching operation of the switching circuit, a charging loop circulating through the first output rectifier diode, the first diode, the first capacitor, and the output winding of the transformer is established. In the charging loop, an LC resonance circuit composed of a first capacitor and a series inductance including a leakage inductance and wiring of the transformer is established, wherein a terminal voltage of the first capacitor is increased in accordance with the waveform of the LC resonance voltage.

In the cycle in which the first output rectifier diode is conducted, a reverse voltage is applied to the second output rectifier diode. Since the series circuit composed of the first capacitor and the first diode is connected in parallel with the second output rectifier diode, a terminal voltage of the second output rectifier diode becomes substantially equal to the terminal voltage of the first capacitor when the forward voltage drop of the first diode is neglected. As described above, the terminal voltage of the first capacitor is increased in accordance with the waveform of the LC resonance voltage yielded by the first capacitor and the series inductance including the leakage inductance and wiring inductance of the transformer. Thus, the surge voltage applied to the second output rectifier diode is restrained in a voltage determined by the LC resonance voltage. Since the surge voltage applied to the second output rectifier diode may be restrained as described above, a diode having a low forward voltage drop may be used as the second output rectifier diode. Thus, the loss due to the second output rectifier diode is reduced, and thereby a low-energy-consumption, highly efficient switching power supply having a center tap type rectifier circuit may be obtained. Further, since the surge voltage applied to the first and second output rectifier diodes is restrained by the LC resonance effect, a low noise snubber circuit may be achieved. In the cycle in which the voltage appearing at the output winding of the transformer is the forward direction to the second output rectifier diode, i.e., in the cycle in which the reverse voltage is applied to the first output rectifier diode, based on the switching operation of the switching circuit, the second snubber circuit is actuated to restrain the surge voltage applied to the first output rectifier diode. Thus, the same effect may be obtained for the first output rectifier diode.

Further, the snubber circuit includes an inductor having one end connected to the output side of the output smoothing circuit and the other end led to the first snubber circuit to form a one-way discharging path for the first capacitor. According to this structure, in the cycle in which the switching circuit is turned off, the energy accumulated in the first capacitor may be regenerated to provide an improved efficiency. In addition, the inductor forms the one-way discharging path shared by the first and second snubber circuits. This may provide the reduced number of parts and a downsized switching power supply.

Other objects, structures, and advantages of the present invention will be further described in details with reference to the attached drawings as embodiments.

BEST MODE FOR CARRING OUT THE INVENTION

Figure 1:
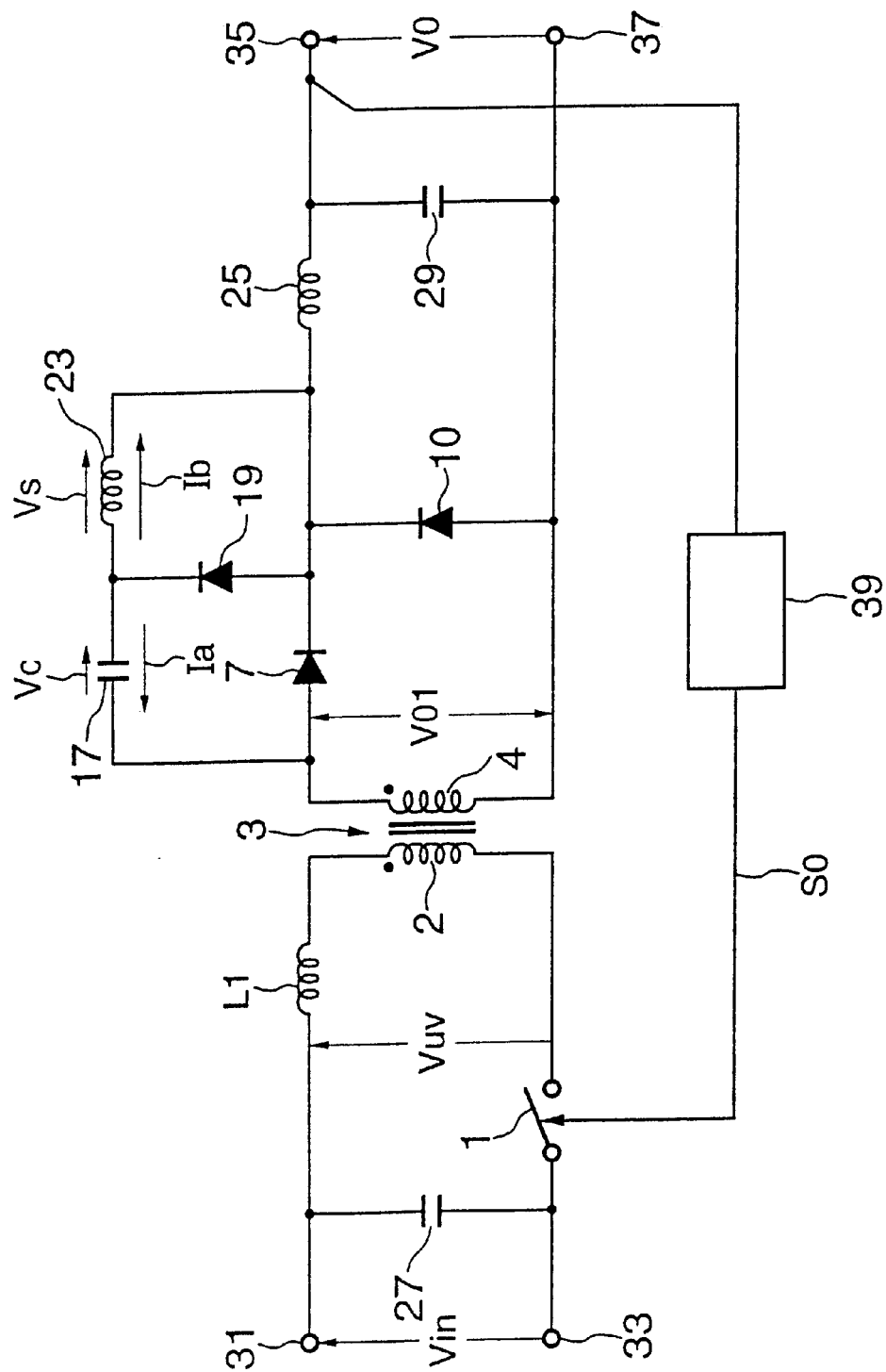
FIG. 1 is an electric circuit diagram of a switching power supply according to the present invention.

FIG. 1 is an electric circuit diagram showing a switching power supply according to the present invention. The illustrated switching power supply includes a transformer 3 having an input winding 2 and an output winding 4. The illustrated transformer 3 has one output winding 4, and both ends of this output winding 4 serve as output ends. Assuming that a coil ratio of the winding number n1 of the input winding 2 to the winding number n2 of the output winding 4 (n1/n2) is arranged in n. In FIG. 1, a series inductance including a leakage inductance of the transformer 3 and wirings is shown as L1.

The switching power supply further includes a switching circuit designated by the numeral 1, an output rectifier circuit, an output smoothing circuit, and a snubber circuit.

The switching circuit 1 switches a DC input voltage Vin supplied through the input winding 2 of the transformer 3. Various known elements or circuits may be employed as a switching circuit 1. In the illustrated embodiment, the switching circuit 1 comprises a single switching element controlled by a control circuit 39. Specifically, the control circuit 39 sends a control signal SO to the switching circuit 1 to control the switching operation of the switching circuit 1. The switching circuit 1 composed of the switching element is connected in series with the input winding 2 of the transformer 3 to form a series circuit which is connected between input terminals 31 and 33. An input capacitor 27 is also connected between the input terminals 31 and 33.

The output rectifier circuit includes an output rectifier diode 7. The output rectifier diode 7 has an anode connected to one end of the output winding 4. The output rectifier diode 7 rectifies a voltage V01 appearing at the output winding 4 to provide an output. The output rectifier circuit shown in FIG. 1 further includes a rectifier diode 10. The cathode of the rectifier diode 10 is connected to the cathode of the output rectifier diode 7, and the anode of the rectifier diode 10 is connected to the other end of the output winding 4.

The output smoothing circuit comprises an output choke coil 25 and an output smoothing capacitor 29. The input side of the output smoothing circuit is connected to the cathode of the output rectifier diode 7 and the other end of the output winding 4. The output smoothing circuit smoothes a rectifier output from the output rectifier circuit to provide an output. The output side of the output smoothing circuit is led to a pair of output terminals 35 and 37.

More specifically, the output choke coil 25 forming the output smoothing circuit is connected between the cathode of the output rectifier diode 7 and the output terminal 35. The output smoothing capacitor 29 is connected between the output terminal 35 connected to the output choke coil 25 and the output terminal 37 connected to the other end of the output winding 4. A terminal voltage of the output smoothing capacitor 29 is output as a DC output voltage V0.

The snubber circuit includes a snubber capacitor 17 and a snubber diode 19. The snubber capacitor 17 and the snubber diode 19 are connected in series with each other at each one end thereof. The other end of the snubber capacitor 17 is led to one end of the output winding 4, while the other end of the snubber diode 19 is led to the cathode of the output rectifier diode 7. The polarity of the snubber diode 19 is arranged depending on the polarity of the output rectifier diode 7. In the illustrated embodiment, the anode of the snubber diode 19 is led to the cathode of the output rectifier diode 7. The cathode of the snubber diode 19 is connected to one end of the snubber capacitor 17, and the other end of the snubber capacitor 17 is connected to the one end of the output winding 4.

The snubber circuit further includes a snubber inductor 23. As one important feature of the present invention, the snubber inductor 23 is connected between the line connecting the snubber capacitor 17 with the snubber diode 19 and the input side of the output smoothing circuit. Specifically, one end of the snubber inductor 23 is connected to one end of the output choke coil 25 led to the output rectifier diode 7.

The action of the switching power supply shown in FIG. 1 will now be described. The switching circuit 1 switches the DC input voltage Vin supplied from the input terminals 31 and 33 to the input winding 2 of the transformer 3 in accordance with a control signal from the control circuit 39. The switching output is taken out from the output winding 4 of the transformer 3.

The output rectifier circuit rectifies the voltage V01 appearing at the output winding 4 of the transformer 3 to provide an output. The output smoothing circuit smoothes the rectifier output from the output rectifier circuit to provide an output. Thus, the switching output transferred to the output winding based on the switching operation of the switching circuit 1 is rectified by the output rectifier circuit, and then smoothed by the output smoothing circuit, followed by taking out from a pair of the output terminals 35 and 37 as a DC voltage V0.

Figure 2:
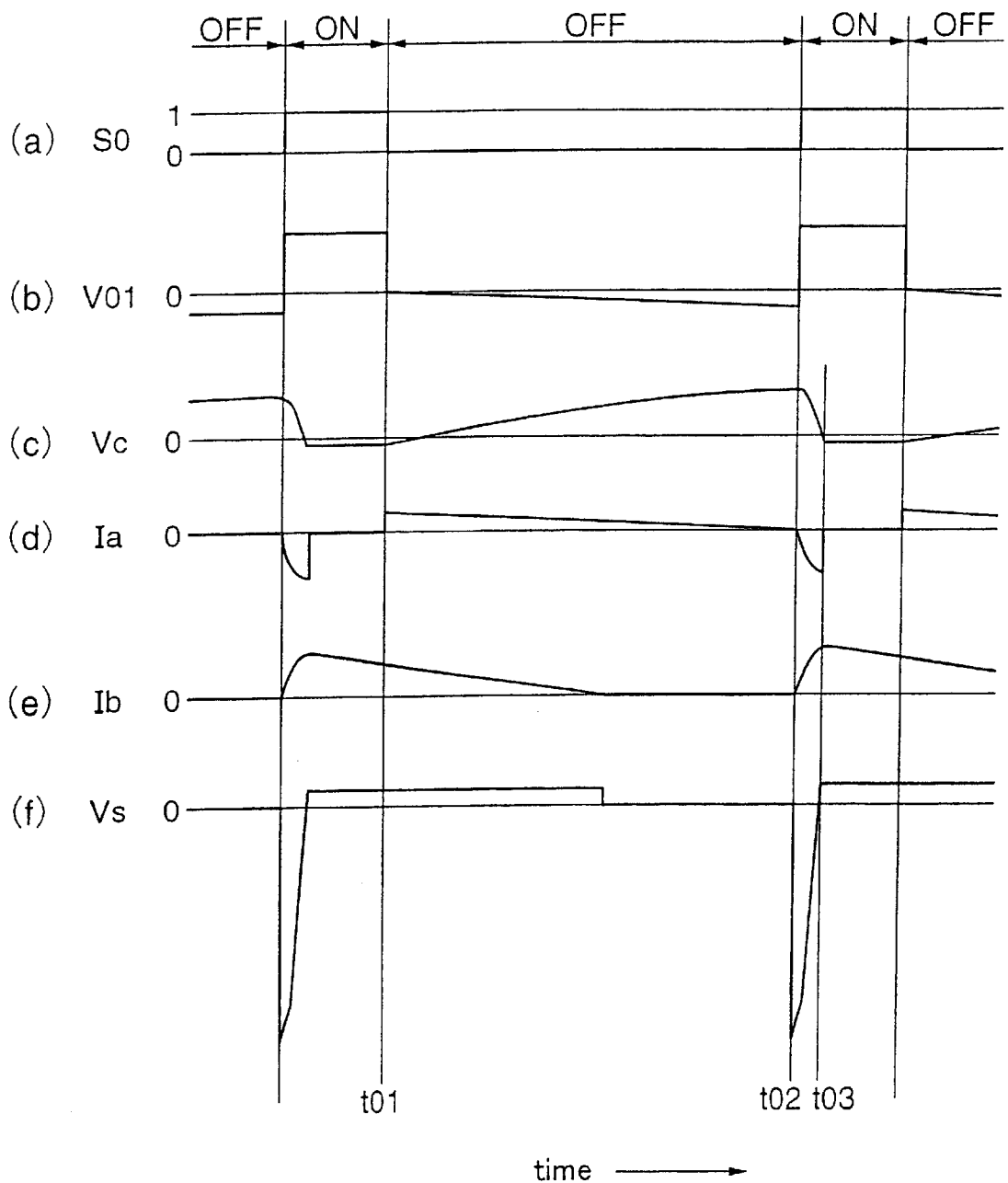
FIG. 2 is a chart showing a waveform of a control signal and voltage or current at each section in the switching power supply shown in FIG. 1.
Figure 3:
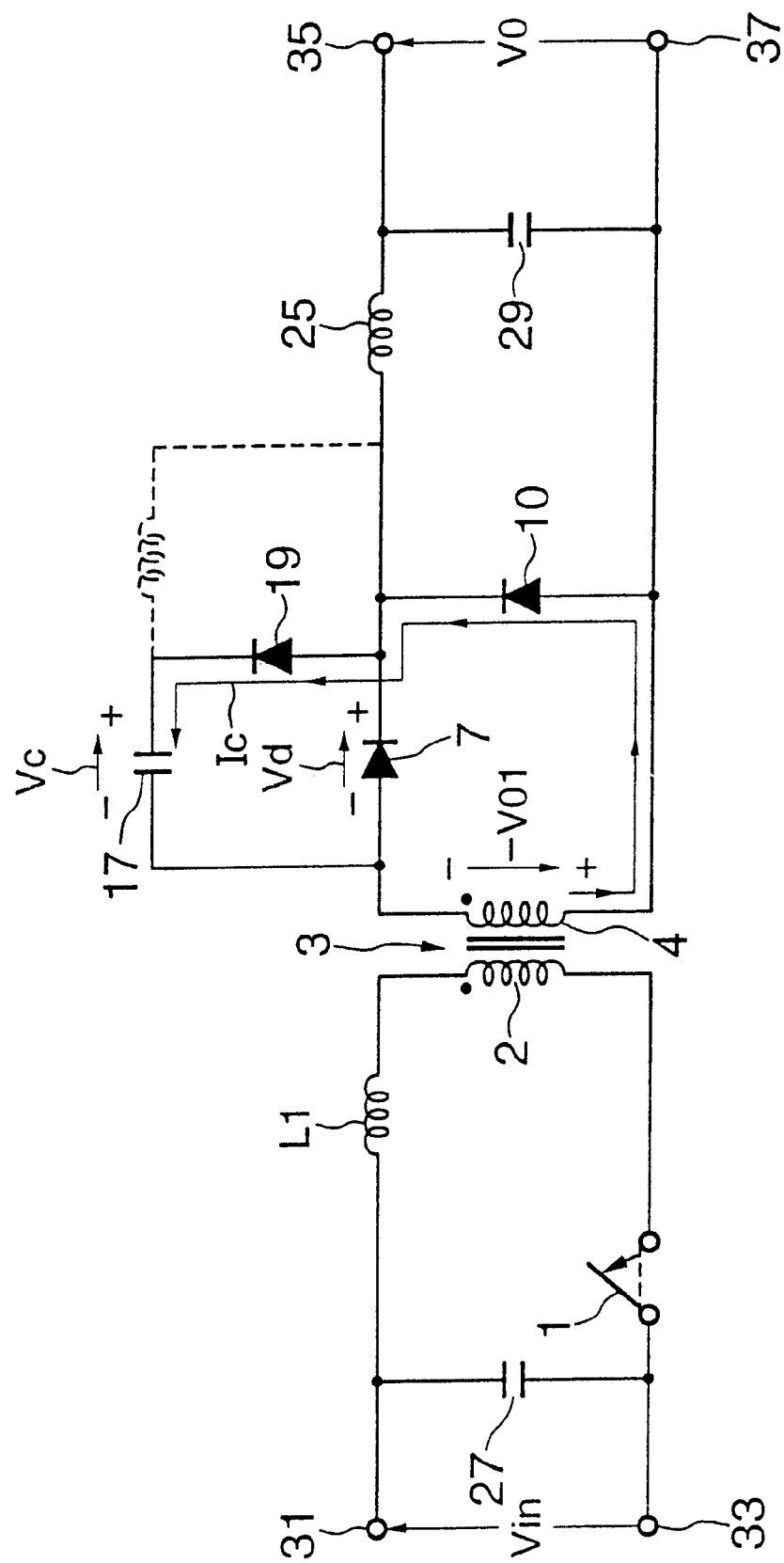
FIG. 3 is a view showing a part of the circuit operated when a switching circuit is turned off from an ON state, in the switching power supply shown in FIG. 1.
Figure 4:
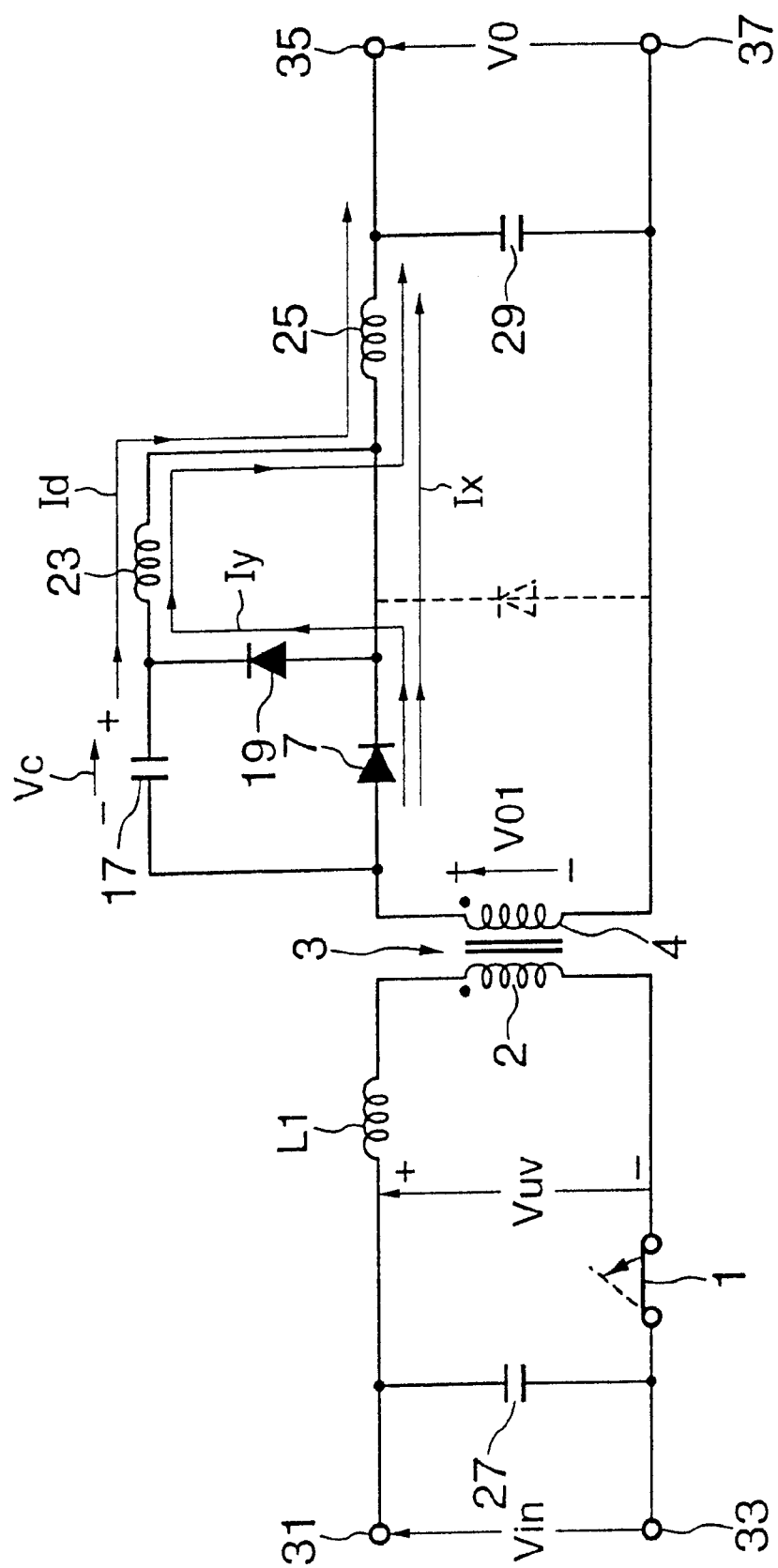
FIG. 4 is a view showing a circuit part operating when the switching circuit is turned on in the switching power supply shown in FIG. 1.

With reference to FIGS. 2 to 4, the operation of the snubber circuit will be described. FIG. 2 is a time chart showing a waveform of the control signal and voltage or current at each section in the switching power supply shown in FIG. 1. Logic values "0" and "1" of the control signal S0 correspond to the ON state and OFF state of the switching circuit 1 composed of the switching element, respectively. FIG. 3 shows a part of the circuit operated when the switching circuit 1 composed of the switching element is turned off from the ON state, and FIG. 4 shows a part of the circuit part operating when the switching circuit 1 composed of the switching element is turned on.

When the switching circuit 1 is in the ON state, a DC voltage Vuv is supplied to the input winding 2 of the transformer 3. As shown in FIG. 2 (*a*), when the switching circuit 1 is turned off at the time t01 from the ON state, the DC voltage Vuv supplied to the input winding 2 of the transformer 3 becomes substantially zero. The voltage (−V01) is generated at the output winding 4 of the transformer by a counter-electromotive force.

FIG. 3 is an explanatory view of the circuit operation in this case. If the switching circuit 1 composed of the switching element is turned off from the ON state, the voltage (−V01) appearing at the output winding 4 of the transformer 3 has the reverse direction to the output rectifier diode 7, and a forward direction to the rectifier diode 10 and the snubber diode 19. Thus, as shown in FIG. 3, a charging loop Ic passing through the output winding 4 of the transformer 3, the rectifier diode 10, the snubber diode 19 and the snubber capacitor 17 is established. In this charging loop Ic, an LC resonance circuit of the leakage inductance L1 of the transformer 3 and the snubber capacitor 17 is established, and thereby the terminal voltage Vc of the snubber capacitor 17 is increased in accordance with the LC resonance voltage waveform as shown in FIG. 2 (*c*). Thus, the reverse voltage Vd applied to the output rectifier diode 7 is restrained in the voltage determined by the LC resonance voltage.

As described above, since the reverse voltage Vd applied to the output rectifier diode 7 may be restrained, the diode having a low forward voltage drop may be used as the output rectifier diode 7. Thus, the loss due to the output rectifier diode 7 is reduced, and thereby a low-energy-consumption, highly efficient switching power supply may be obtained. Moreover, as the reverse voltage Vd applied to the output rectifier diode 7 may be restrained by the LC resonance effect, a low noise snubber circuit may be realized.

As shown in FIG. 2 (*a*), the state when the switching circuit 1 is turned on at the time t02 will be described. FIG. 4 is an explanatory view of the circuit operation in this case. When the switching circuit 1 is turned on, the DC voltage Vuv appears on the output side of the switching circuit 1. This DC voltage Vuv is supplied to the input winding 2 of the transformer 3, and the voltage V01 is generated at the output winding 4 by the transformer coupling between the input winding 2 and the output winding 4.

The voltage V01 appearing at the output winding 4 of the transformer 3 when the switching circuit 1 is turned on has the forward direction to the output rectifier diode 7. Thus, as shown in FIG. 4, the current Ix passes through the output rectifier diode 7 from the output winding 4 to the input side of the output smoothing circuit.

The voltage 01 appearing at the output winding 4 of the transformer 3 when the switching circuit 1 is turned on has the forward direction to the output rectifier diode 7. Thus, as shown in FIG. 4, in the snubber circuit, a discharging path Id for the snubber capacitor 17 is established. The discharging path Id serves as a circuit for discharging the energy accumulated in the snubber capacitor 17 through the snubber inductor 23. At the time t02 when the switching circuit 1 is turned on, the discharge current is started to flow from the snubber capacitor 17 (see FIG. 2(*d*)), and the terminal-based voltage Vc of the snubber capacitor 17 is decreased (see FIG. 2(*c*)).

Since the snubber inductor 23 is connected between the line connecting the snubber capacitor 17 with the snubber diode 19 and the input side of the output smoothing circuit, the energy accumulated in the snubber capacitor 17 is regenerated on the input side of the output smoothing circuit through the snubber inductor 23, which provides an improved efficiency.

At the time t02 when the switching circuit 1 is turned on, the discharge current from the snubber capacitor 17 flows to the snubber inductor 23 (FIG. 2 (*e*)). Then, as shown in FIG. 2 (*c*), the terminal-based voltage Vc of the snubber capacitor 17 is decreased. When the voltage Vc becomes equal to the forward voltage drop of the output rectifier diode 7 and the snubber diode 19 at the time t03, the regeneration of the energy from the snubber capacitor 17 is complete. At this time, the voltage applied to the snubber inductor 23 becomes a forward direction voltage (−Vf) to the snubber diode 19 (see FIG. 2 (*f*)). Thus, the current flowing into the snubber inductor 23 is decreased at a certain ratio (di/dt) (see FIG. 2 (*e*)).

As one important feature of the present invention, the snubber inductor 23 is connected between the line connecting the snubber capacitor 17 with the snubber diode 19 and the input side of the output smoothing circuit. In this structure, the snubber inductor 23 is never arranged in parallel with the choke coil 25 of the output smoothing circuit. In the snubber circuit, the anode of the snubber diode 19 is also led to the cathode of the output rectifier diode 7, while the cathode of the output rectifier diode 7 is connected to the input side of the output smoothing circuit. This brings both ends of the series circuit of the snubber diode 19 and the snubber inductor 23 into an electrically connected state, or electrically short-circuited state, at the input side of the output smoothing circuit. Thus, in a cycle in which the voltage V01 appearing at the output winding 4 of the transformer 3 is the forward direction to the output rectifier diode 7 based on the switching operation of the switching circuit 1, the currently passing through the snubber diode 19 and snubber inductor 23 of the snubber circuit becomes extremely small. Thus, the loss due to the forward voltage drop in the snubber diode 19 and the loss due to the DC resistance of the snubber inductor 23 in the snubber circuit are decreased to the extent that they may be substantially negligible.

Further, as described above, the current Iy flowing through the snubber diode 19 and snubber inductor 23 of the snubber circuit becomes extremely small, a low capacity, low power element may be used as the snubber diode 19 and snubber inductor 23 of the snubber circuit. As a result, the snubber diode 19 and snubber inductor 23 in the snubber circuit may be downsized, and thereby a small size switching power supply may be provided.

Figure 5:
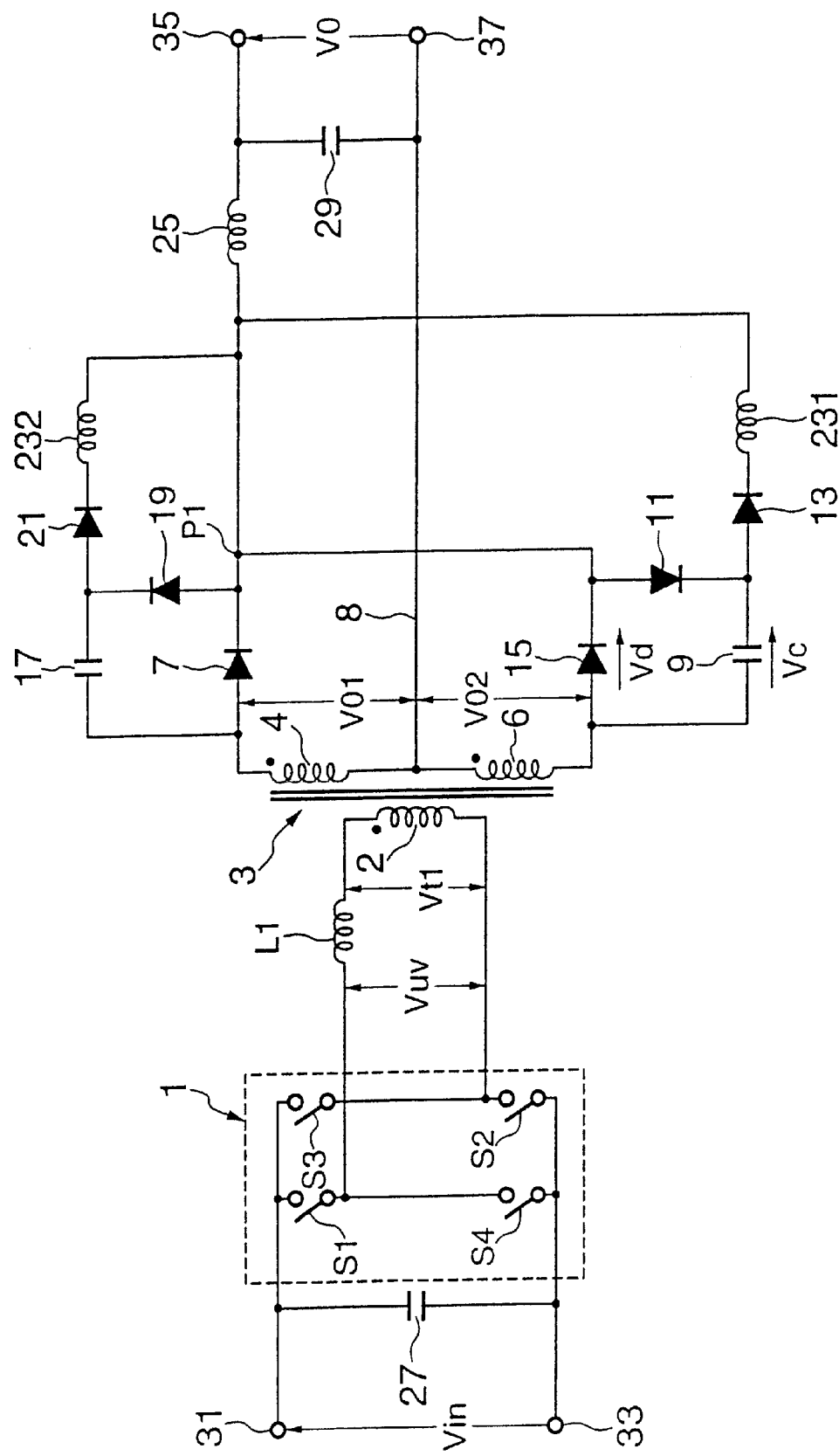
FIG. 5 is an electric circuit diagram showing another embodiment of the switching power supply according to the present invention.

FIG. 5 is an electric circuit diagram showing another embodiment of the switching power supply according to the present invention. In this figure, the same elements or components as those in FIGS. 1, 3 and 4 will be defined by the same numerals. In this embodiment, the switching power supply includes a transformer, a switching circuit, an output rectifier circuit, an output smoothing circuit and a snubber circuit, as in the previous example.

The transformer 3 includes an input winding 2, and output windings 4 and 6 connected in series with each other. The transformer 3 in the illustrated embodiment has a center tap 8 between the output windings 4 and 6, and the center tap 8 and both ends of the output windings 4 and 6 form output ends, respectively. The coil ratio of the winding number n1 of the input winding 2 to the winding number n2 of the output winding 4 (n1/n2), and the coil ratio of the winding number n1 of the input winding 2 to the winding number n3 of the output winding 6 are arranged in n, together. As in the embodiment shown in FIGS. 1, 3 and 4, in FIG. 5, the series inductance including the leakage inductance of the transformer 3 and the wiring is shown as L1.

The switching circuit 1 switches a DC input voltage Vin supplied through the input winding 2 of the transformer 3. The switching circuit 1 is composed of four switching elements S1, S2, S3 and S4 in form of a bridge connection. The input capacitor 27 is provided on the run-up side of the switching circuit 1, and the switching circuit 1 is connected to the input terminals 31 and 33 through the input capacitor 27. It is apparent that a control circuit is, but not shown, provided to control the switching operation of the switching elements S1, S2, S3 and S4.

The output rectifier circuit includes the first output rectifier diode 7 and the second output rectifier diode 15. The anode of the first output rectifier diode 7 is connected to one end of the output winding 4. The anode of the second output rectifier diode 15 is connected to one end of the output winding 6. The first and second output rectifier diodes 7 and 15 have the cathodes having the same polarity and connected with each other. Thus, a center tap type rectifier circuit is formed by the output rectifier circuits 7 and 15.

The input side of the output smoothing circuit is connected to the cathodes of the first and second rectifier diodes 7 and 15. The output smoothing circuit smoothes and outputs the rectifier output of the output rectifier circuit. Both ends of the input side of the illustrated output smoothing circuit are connected to a connection point P1 of the first and second output rectifier diodes 7 and 15 and the center tap 8, respectively, and the output side of the output smoothing is led to a pair of the output terminals 35 and 37.

More particularly, the output smoothing circuit includes the output choke coil 25 connected between the input side and the output side. Specifically, both ends of the output choke coil 25 are connected between the connection point P1 of the first and second output rectifier diodes 7 and 15 and the output terminal 35. Further, the output smoothing circuit includes the output smoothing capacitor 29, and both ends of the output smoothing capacitor 29 are connected between the output terminal 37 connected to the center tap 8 and the output terminal 35 connected to the output choke coil 25. The terminal voltage of the output smoothing capacitor 29 is output as the DC output voltage V0.

The snubber circuit includes a first snubber circuit and a second snubber circuit. The first snubber circuit includes the first snubber capacitor 9 and the first snubber diode 11. The first snubber capacitor 9 and the first snubber diode 11 are connected in series with each other to form a series circuit, and this series circuit is connected in parallel with the second output rectifier diode 15. In this parallel circuit, the first snubber diode 11 has a reverse polarity to the second output rectifier diode 15.

The second snubber circuit includes the second snubber capacitor 17 and the second snubber diode 19. The second snubber capacitor 17 and the second snubber diode 19 are connected in series with each other, and connected in parallel with the first output rectifier diode 7. The second snubber diode 19 has a reverse polarity to the first output rectifier diode 7. The first snubber circuit includes a first snubber inductor 231, while the second snubber circuit includes a second snubber inductor 232.

As one important feature of the present invention, the first snubber inductor 231 is connected between the line connecting the first snubber capacitor 9 with the first snubber diode 11 and the input side of the output smoothing circuit. More specifically, one end of the first snubber inductor 231 is connected to an end of the output choke coil 25 led to the output rectifier diode 15.

The second snubber inductor 232 is connected between the line connecting the second snubber capacitor 17 with the second snubber diode 19 and the input side of the output smoothing circuit. An end of the second snubber inductor 232 is connected to an end of the output choke coil 25 led to the output rectifier diode 7.

The first snubber circuit includes a third snubber diode 13. The third snubber diode 13 is interposed between the line connecting the first snubber capacitor 9 with the first snubber diode 11 and the first snubber inductor 231. Specifically, an anode of the third snubber diode 13 is connected to the connection point of the first snubber capacitor 9 and the first snubber diode 11, and a cathode is connected to the other end of the first snubber inductor 231.

The second snubber circuit includes a fourth snubber diode 21. The fourth snubber diode 21 is interposed between the line connecting the second snubber capacitor 17 with the second snubber diode 19 and the second snubber inductor 232. An anode of the fourth snubber diode 21 is connected to the connection point of the second snubber capacitor 17 and the second snubber diode 19, and a cathode of the fourth snubber diode 21 is connected to the other end of the second snubber inductor 232.

The action of the switching power supply illustrated in FIG. 5 will now be described. Since the output windings 4 and 6 of the transformer 3 includes the center tap 8, and the center tap 8 is led to the output terminal 37, this device becomes a switching power supply having a center tap type rectifier circuit. The switching circuit 1 switches the DC voltage Vin which is supplied from the input terminals 31 and 33 to the input winding 2 of the transformer 3. The switching output is taken out on the side of the output windings 4 and 6 of the transformer 3.

The anode of the first output rectifier diode 7 is connected to one end of the output winding 4. An anode of the second output rectifier diode 15 is connected to one end of the output winding 6. The first and second output rectifier diodes 7 and 15 have their cathodes connected to each other as the same polarity. Thus, the voltages V01 and V02 appearing in the side of the output windings 4 and 6 based on the switching operation of the switching circuit 1 are rectified by the first and second output rectifier diodes 7 and 15, and the rectified output is generated between the center tap 8 and the connection point P1 of the first and second output rectifier diodes 7 and 15.

The input side of the output smoothing circuit is connected to the connection point P1 of the first and second output rectifier diodes 7 and 15 and the center tap 8, while the output side of the output smoothing circuit is led to a pair of the output terminals 35 and 37. Thus, the rectified output generated between the connection point P1 of the first and second output rectifier diodes 7 and 15 and the center tap 8 is smoothed by the output smoothing circuit, and then the DC output V0 is taken out from a pair of the output terminals 35 and 37.

Figure 6:
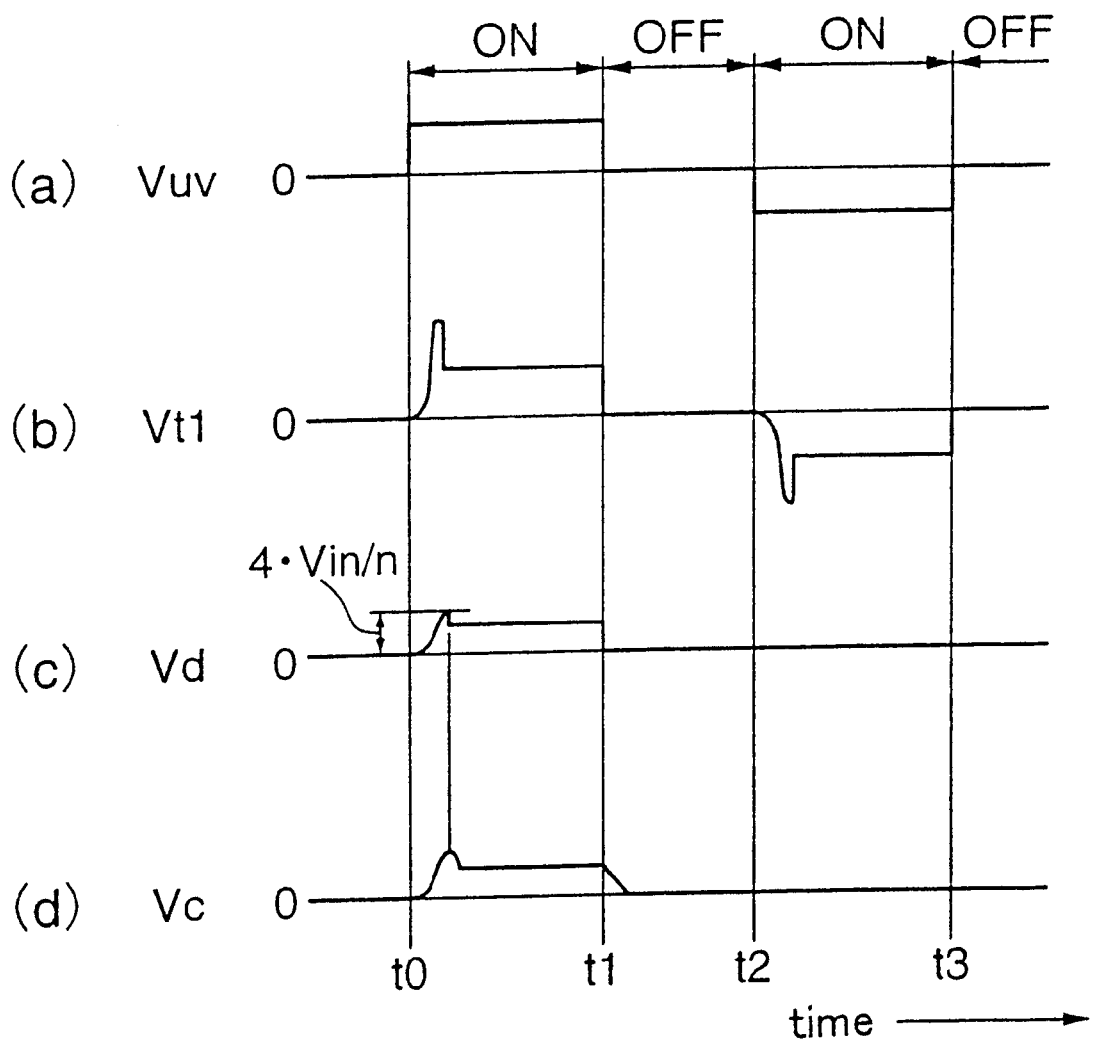
FIG. 6 is a chart showing a voltage waveform of each section in the switching power supply shown in FIG. 5.
Figure 7:
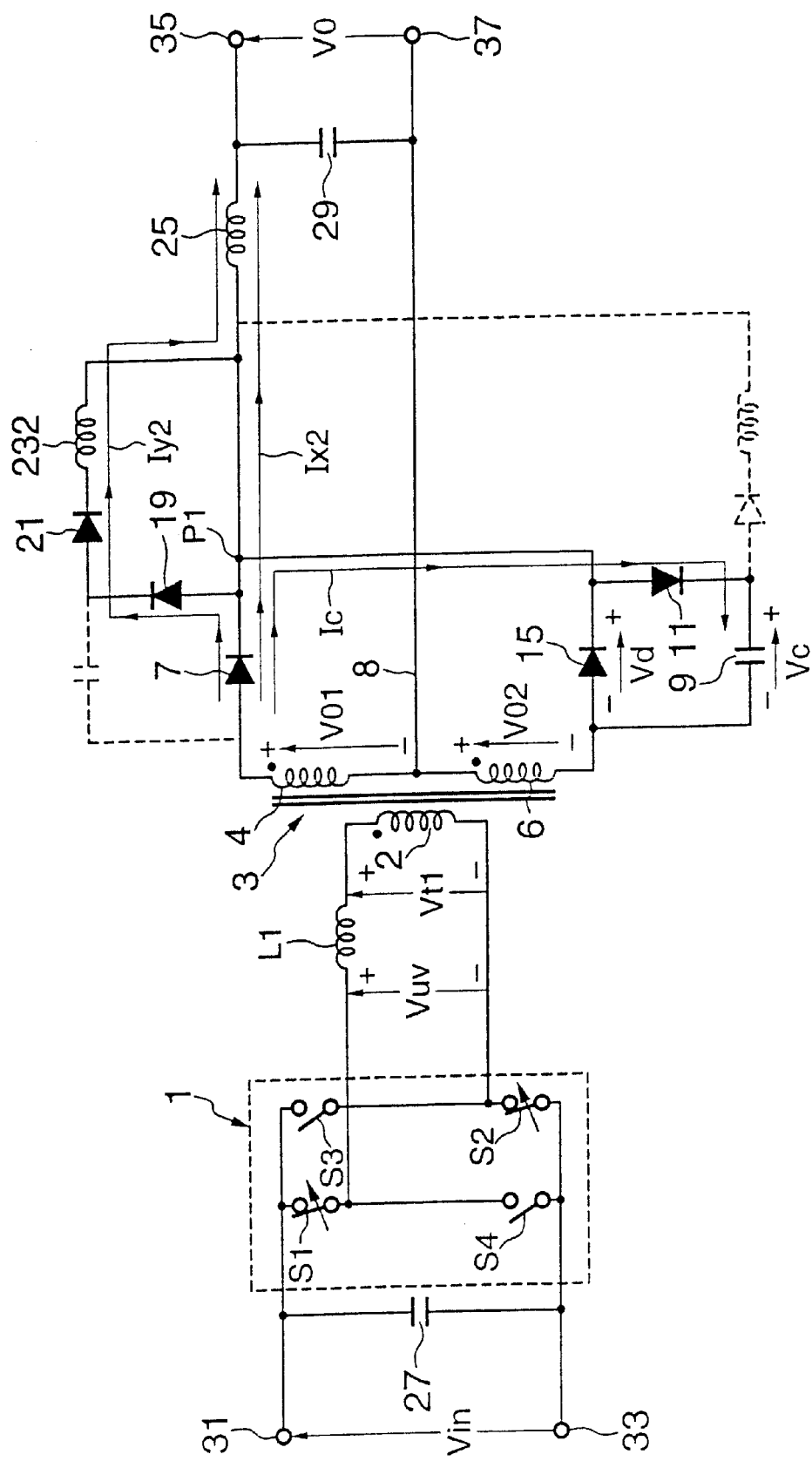
FIG. 7 is a view showing a part of the circuit operated when switching elements S1 and S2 of the switching circuit are turned on, in the switching power supply shown in FIG. 5.
Figure 8:
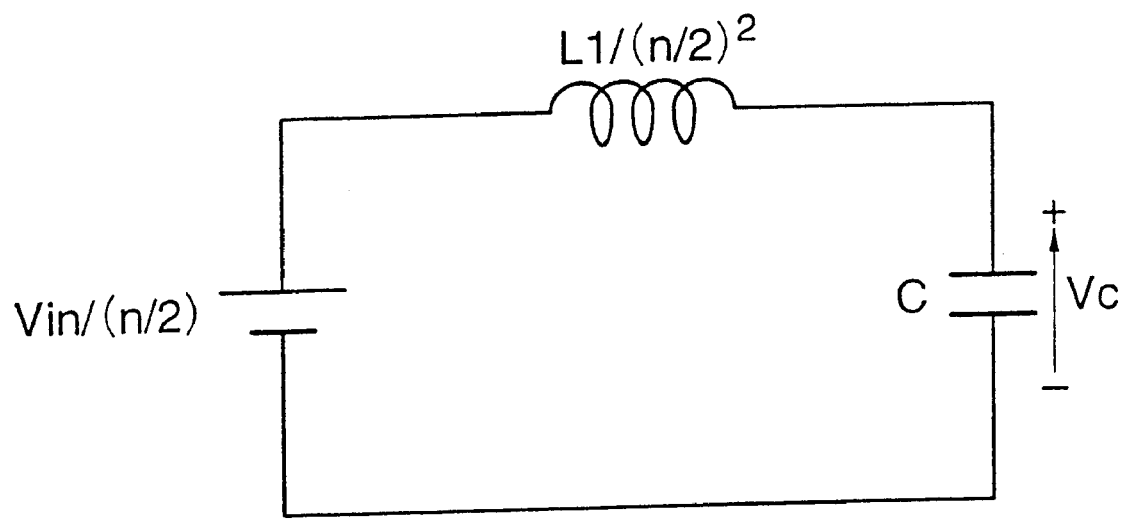
FIG. 8 is an equivalent circuit diagram in the operating state in FIG. 7.
Figure 9:
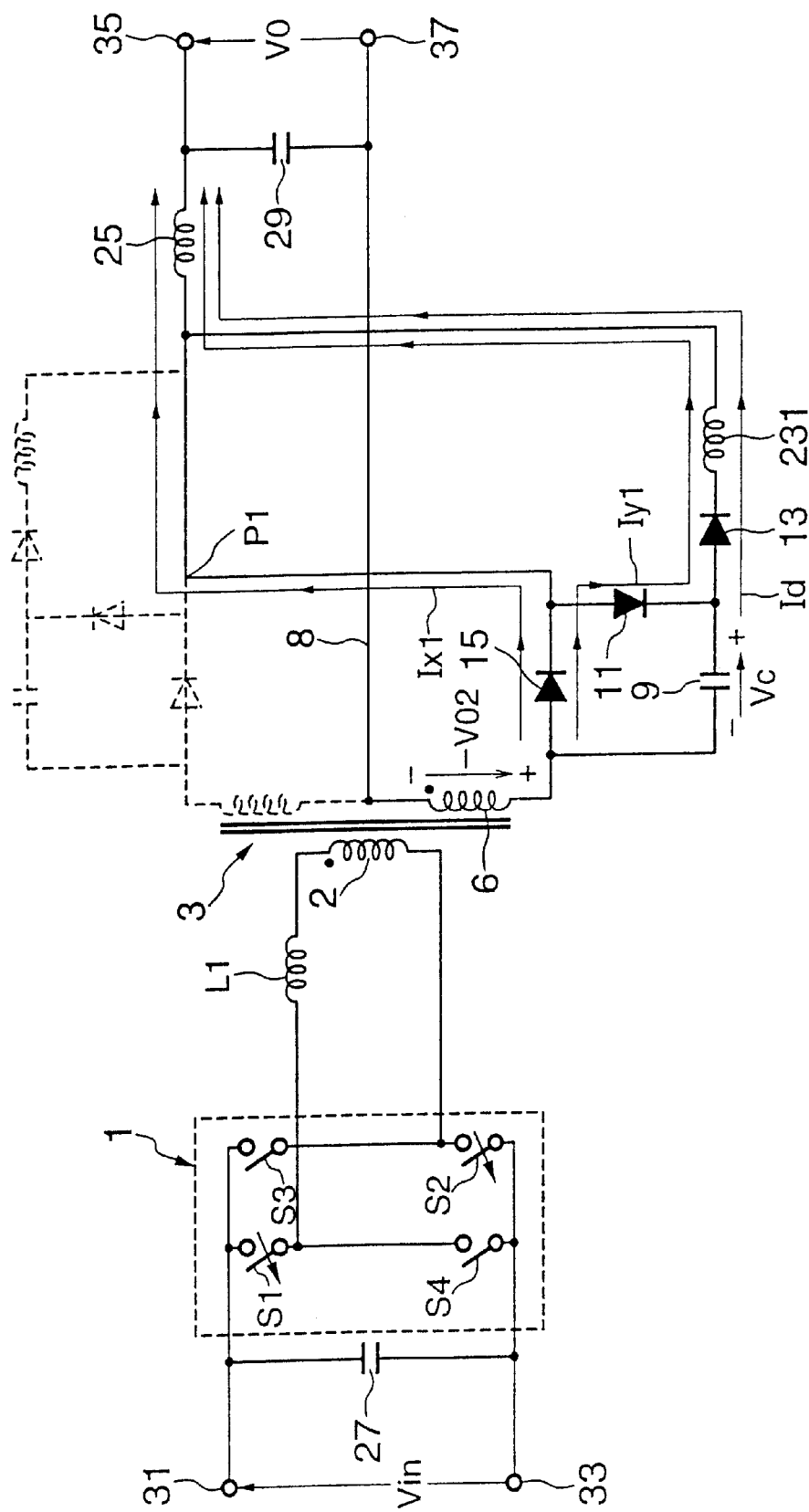
FIG. 9 is a view showing a part of the circuit operated when switching elements S1 and S2 of the switching circuit are turned off, in the switching power supply shown in FIG. 1.

The operation of the first and second snubber circuits will now be described with reference to FIGS. 6 to 9. FIG. 6 is a time chart showing the voltage waveform at each section in the switching power supply shown in FIG. 5. FIG. 7 shows a part of the circuit operated when the switching elements S1 and S2 of the switch circuit 1 of the switching power supply shown in FIG. 5 are turned on. FIG. 8 is an equivalent circuit diagram in the operated state in FIG. 7. FIG. 9 shows a part of the circuit operated when the switching elements S1 and S2 of the switching circuit 1 shown in FIG. 5 are turned off. The first and second snubber circuits have different operating timings, but are substantially the same in structure and action. Thus, the operation of the first snubber circuit will be mainly described, and the description of the second snubber circuit will be omitted.

As shown in FIG. 6(a), when the switching circuit 1 is turned on at the time t0, the DC voltage Vuv appears on the output side of the switching circuit, and the DC voltage Vuv is supplied to the input winding 2 of the transformer 3. The voltage Vt1 in the input winding 2 of the transformer 3 has a LC resonance voltage waveform as shown in FIG. 6 (b). The voltage Vt1 is transferred to the output side of the transformer 3 by the transformer coupling between the input winding 2 and the output windings 4 and 6.

FIG. 7 is an explanatory view of the circuit operation in this case. In the switching circuit 1 having the circuitry shown in FIG. 5, when the switching elements S1 and S2 are turned on, the voltages V01 and V02 appearing at the output windings 4 and 6 of the transformer 3 has the reverse direction to the second output rectifier diode 15, and the forward direction to the first output rectifier diode 7 and the first snubber diode 11. Thus, as shown in FIG. 7, a charging loop Ic circulating through the first output rectifier diode 7, the first snubber diode 11, the snubber capacitor 9 and the output windings 4 and 6 of the transformer 3 is established. In the charging loop Ic, the LC resonance circuit of a series inductance L1 of the transformer 3 and the first snubber capacitor 9 is established. The terminal voltage Vc of the first snubber capacitor 9 is increased in accordance with the LC resonance voltage waveform as shown in FIG. 6(d).

FIG. 8 is an equivalent circuit diagram of the LC resonance circuit of the series inductance L1 of the transformer 3 and the first snubber capacitor 9. According to this equivalent circuit diagram, the terminal voltage Vc of the first snubber capacitor 9 is determine as follow.

$$Vc = 2 \cdot Vin \cdot (1 - \cos\omega t)/n.$$

where $\omega = 1/(L1 \cdot C/(n/2)^2)^{1/2}$

In the cycle in which the first output rectifier diode 7 is conducted, a reverse voltage Vd is applied to the second output rectifier diode 15.

Hereat, since the series circuit composed of the first snubber capacitor 9 and the first snubber diode 11 is connected in parallel with the second output rectifier diode 15, the reverse voltage Vd applied to the second output rectifier diode 15 becomes approximately equal to the terminal voltage Vc of the first snubber capacitor 9 if the forward voltage drop of the first snubber diode 11 is neglected. As described above, the terminal voltage Vc of the first snubber capacitor 9 is increased in accordance with the LC resonance voltage waveform based on the series inductance of the transformer 3 and the first snubber capacitor 9. Thus, the reverse voltage Vd applied to the second output rectifier diode 15 is restrained in the voltage determined by the LC resonance voltage.

The maximum value (peak value) Vdm of the reverse voltage Vd is derived from the above formula as follows.

$$Vdm = 2 \cdot Vin \cdot (1 - \cos\pi)/n \qquad (1)$$

$$= 4 \cdot Vin/n$$

As described above, since the reverse voltage Vd applied to the second output rectifier diode 15 may be restrained, a diode having a low forward voltage drop may be used as the second output rectifier diode 15. Thus, the loss due to the second output rectifier diode 15 may be reduced, and thereby a low-energy-consumption, highly efficient switching power supply having a center tap type rectifier circuit may be obtained. Further, since the reverse voltage Vd applied to the second output rectifier diodes 7 and 15 is restrained by the LC resonance effect, a low noise snubber circuit may be achieved.

As described above, in the switching circuit 1, when the switching elements S1 and S2 are turned on, the voltage V01 appearing at the output winding 4 of the transformer 3 has the forward direction to the first output rectifier diode 7. Thus, as shown in FIG. 7, the current Ix2 flows from the output winding 4 through the first output rectifier diode 7 to the input side of the output smoothing circuit.

As one important feature of the present invention, the second snubber inductor 232 is connected between the line connecting the second snubber capacitor 17 with the second snubber diode 19 and the input side of the output smoothing circuit. In this structure, the second snubber inductor 232 is never arranged in parallel with the choke coil 25 of the smoothing circuit. In the second snubber circuit, the anode of the second snubber diode 19 is led to the cathode of the first output rectifier diode 7, while the cathode of the first output rectifier diode 7 is connected to the input side of the output smoothing circuit. This brings both ends of the series circuit composed of the second snubber diode 19 and the second snubber inductor 232 into an electrically connected state, or electrically short-circuited state, at the input side of the output smoothing circuit. Thus, in the cycle in which the voltage V01 appearing at the output winding 4 of the transformer 3 based on the switching operation of the switching circuit 1 is the forward direction to the first output rectifier diode 7, the currently passing through the second snubber diode 19 and second snubber inductor 232 of the second snubber circuit becomes extremely small. Thus, the loss due to the forward voltage drop of the second snubber diode 19 and the loss due to the DC resistance of the second snubber inductor 232 in the second snubber circuit are decreased to the extent that they may be substantially negligible.

As described above, since the current Iy2 flowing through the second diode 19 and the second snubber inductor 232 in the second snubber circuit becomes extremely small, a low capacity, low power element may be used as the second snubber diode 19 and second snubber inductor 232 in the second snubber circuit. Thus, the second snubber diode 19 and second snubber inductor 232 forming the second snubber circuit may be downsized, and thereby a small size switching power supply may be provided.

As shown in FIG. 6(a), the state when the switching elements S1 and S2 are turned off at the time t1 will be described. FIG. 9 is an explanatory view of the circuit operation in this case. When the switching elements S1 and S2 are turned off, the voltage (−V02) appearing at the output winding 6 of the transformer 3 has the forward direction to the second output rectifier diode 15. The first snubber circuit includes the first inductor 231. One end of the first inductor 231 is connected to the input side of the output smoothing circuit, while the other end of the first inductor 231 is led to the first snubber circuit so as to form a one-way discharging path Id for the first capacitor 9. Thus, as shown in FIG. 9, when the switching elements S1 and S2 are turned off at the time t1, the energy accumulated in the first capacitor 9 is regenerated on the load side through the one-way discharging path Id, which provides an enhanced efficiency. As described above, when the switching elements S1 and S2 are turned off, the voltage (−V02) appearing at the output winding 6 of the transformer 3 has the forward direction to the second output rectifier diode 15. Thus, as shown in FIG. 9, the current Ix1 flows from the output winding 6 through the second output rectifier diode 15 to the input side of the output smoothing circuits 25 and 29.

As one important feature of the present invention, the first inductor 231 is connected between the line connecting the first capacitor 9 with the second snubber diode 11 and the input side of the output smoothing circuit. In this structure, the first snubber inductor 231 is never arranged in parallel with the choke coil 25 in the smoothing circuit. Further, in the first snubber circuit, the anode of the first snubber diode 11 is led to the cathode of the second output rectifier diode 15, and the cathode of the second output rectifier diode 15 is connected to the input side of the output smoothing circuit. This brings both ends of the series circuit of the first snubber diode 11 and the first snubber inductor 231 into an electrically connected state, or electrically short-circuited state, at the input side of the output smoothing circuit. Thus, in the cycle in which the voltage V02 appearing at the output winding 6 of the transformer 3 based on the switching operation of the switching circuit 1 is the forward direction to the second output rectifier diode 15, the current ly1 passing through the first snubber diode 11 and the first snubber inductor 231 in the first snubber circuit become extremely small. Thus, the loss due to the forward voltage drop of the first snubber diode 11 and the loss due to the DC resistance of the first snubber inductor 231 in the first snubber circuit are decreased to the extent that they may be substantially negligible.

As described above, since the current ly1 flowing through the first diode 11 and the first snubber inductor 231 in the first snubber circuit becomes extremely small, an low capacity, low power element may be used as the first snubber diode 11 and the first snubber inductor 231 in the first snubber circuit. Thus, the first snubber diode 11 forming the first snubber circuit and the first snubber inductor 231 may be downsized, and thereby a small size switching power supply may be provided.

While the description will be omitted, in the cycle in which the switching elements S3 and S4 are turned on, the switching elements S1 and S2 being turned off, and the voltage appearing at the output windings 4 and 6 of the transformer 3 having the forward direction to the second output rectifier diode 15, a reverse voltage is applied to the first output rectifier diode 7. In this case, the second snubber circuit operates, and the surge voltage applied to the first output rectifier diode 7 is restrained. Thus, the same effect may be obtained in the first output rectifier diode 7. When the switching elements S3 and S4 are turned off, the circuit carries out the same action as with the state when the switching elements S1 and S2 are turned off, which provides the same result.

Figure 10:
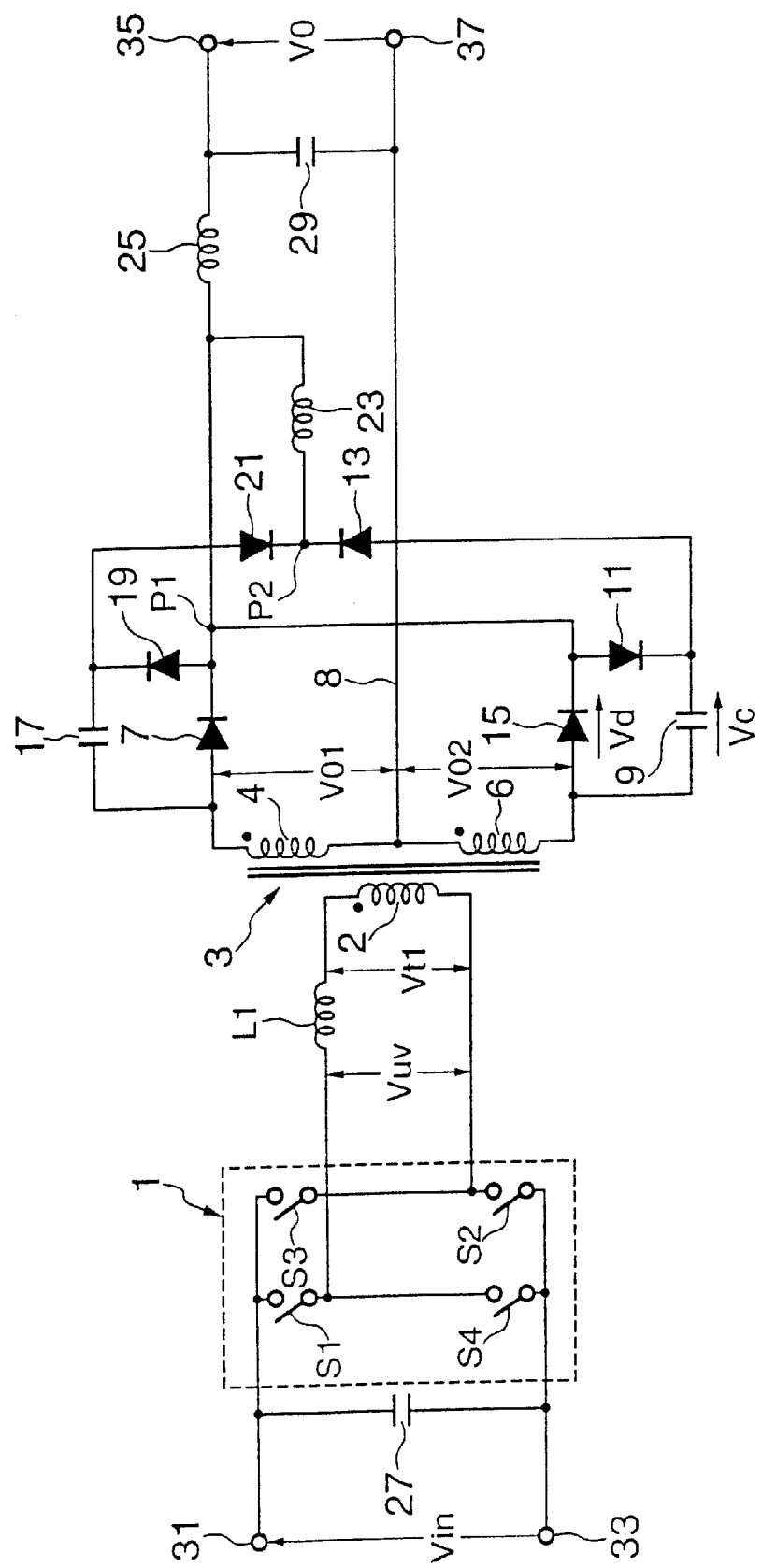
FIG. 10 is an electric circuit diagram showing another embodiment of the switching power supply according to the present invention.

FIG. 10 is an electrical circuit diagram showing another embodiment of the switching power supply according to the present invention. In this figure, the same elements or components as those in FIG. 5 will be defined by the same numerals. As compared with the embodiment shown in FIG. 5, the feature of this embodiment is that the snubber inductor 23 is shared, or commonly used, by the first snubber circuit and the second snubber circuit. Specifically, one end of the snubber inductor 23 is connected to the input side of the output smoothing circuit, and the other end of the snubber inductor 23 is led to the first and second snubber circuits, so as to form a one-way discharging path for the first and second snubber capacitors 9 and 17.

In this embodiment, the first snubber circuit includes the third snubber diode 13. The anode of the third snubber diode 13 is connected to one end of the first snubber capacitor 9 led to the first snubber diode 11. The second snubber circuit includes the fourth snubber diode 21. The anode of the fourth snubber diode 21 is connected to one end of the second snubber capacitor 17 led to the second snubber diode 19, while the cathode of the fourth snubber diode 21 is connected to the cathode of the third snubber diode 13.

The inductor 23 is connected between the connection point P2 of the third and fourth snubber diodes 13 and 21 and the input side of the output smoothing circuit. More specifically, one end of the snubber inductor 23 is connected to an end of the output choke coil 25 led to the first and second output rectifier diodes 7 and 15.

In the embodiment shown in FIG. 10, the inductor 23 is shared, or commonly used, by both the first and second snubber circuits, and thus the number of parts may be reduced, which may provide a downsized snubber circuit. Further, in the embodiment shown in FIG. 10, the same action as in the embodiment shown in FIG. 5 may be obtained. For example, the loss due to the forward voltage drop of the first snubber diode 11 forming the first snubber circuit, the loss due to the forward voltage drop of the second snubber diode 19 in the second snubber circuit, and the loss due to the DC resistance of the snubber inductor 23 are decreased to the extent that they may be substantially negligible. Further, a low capacity, low power element may be used as the first snubber diode 11 in the first snubber circuit, the second snubber diode 19 in the second snubber circuit and the snubber inductor 23. Thus, the first snubber diode 11 forming the first snubber circuit, the second snubber diode 19 in the second snubber circuit and the snubber inductor 23 may be downsized, and thereby a small size switching power supply may be provided.

Figure 11:
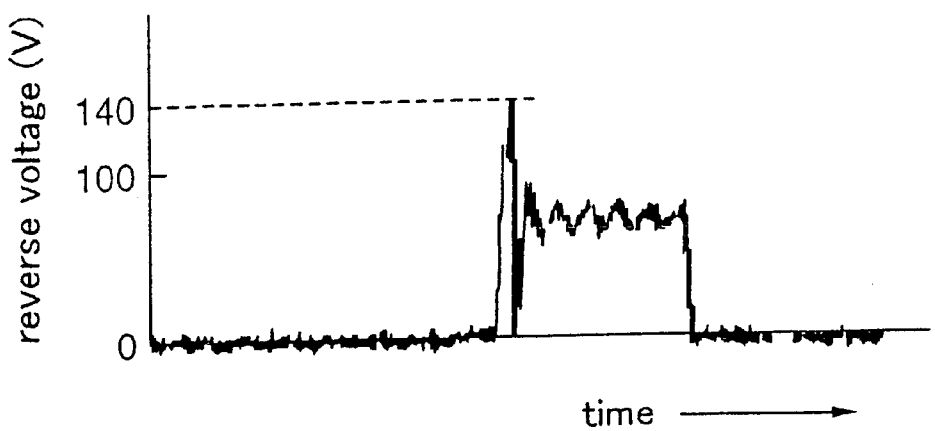
FIG. 11 is a view showing a measured waveform of a reverse voltage applied to an output rectifier diode, in the switching power supply shown in FIG. 10.
Figure 12:
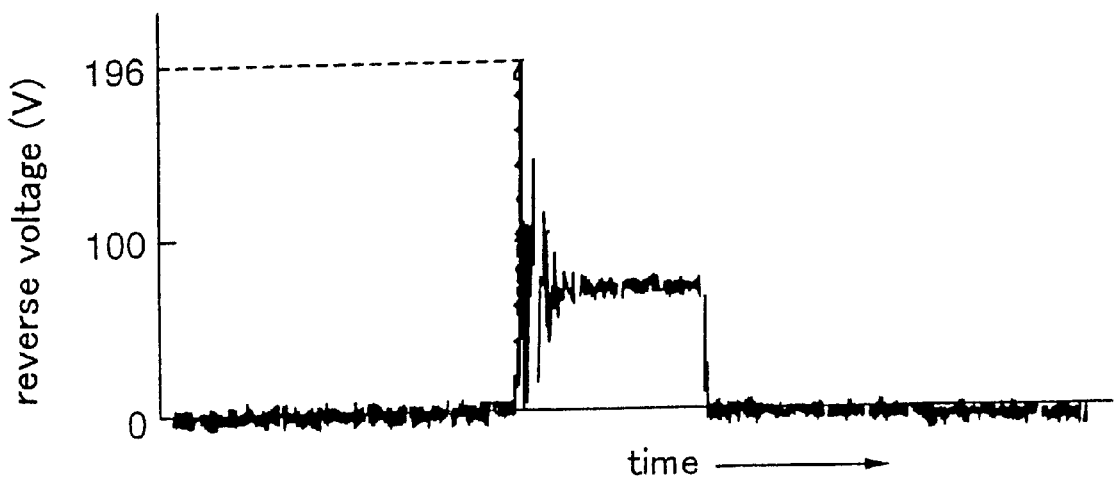
FIG. 12 is a view showing a measured waveform of a reverse voltage applied to a output rectifier diode in a switching power supply using a conventional snubber circuit.

The experimental result of the reverse voltage applied to the output rectifier diode will be described. FIG. 11 is a view showing a measured waveform of the reverse voltage applied to the output rectifier diode of the switching power supply shown in FIG. 10. FIG. 12 is a view showing a measured waveform of the reverse voltage applied to the output rectifier diode in the switching power supply using a conventional snubber circuit. The conventional snubber circuit used for obtaining the waveform diagram of FIG. 12 is composed of a series circuit of a capacitor and a resistance, and the series circuit is connected in parallel with the first and second output rectifier diodes, respectively. There is no significant difference between the switching power supply for obtaining the data in FIG. 11 and the switching power supply for obtaining the data in FIG. 12 except the construction of the snubber circuit. Both of the waveform charts in FIGS. 11 and 12 are obtained under the conditions where the input voltage Vin is 288 V, and the coil ratio n of the transformer 3 is eight (8). Thus, the maximum voltage applied to the output rectifier diode is ideally, 144 V (see the above formula (1)).

Referring to FIG. 12, it is proved that the reverse voltage applied to the output rectifier diode goes up to 196 V in the switching power supply employing the conventional snubber circuit. On the other hand, in the switching power supply according to the present invention, the reverse voltage applied to the output rectifier diode is approximately 140 V as shown in FIG. 11, which is drastically lower than the switching power supply employing the conventional snubber circuit.

Figure 13:
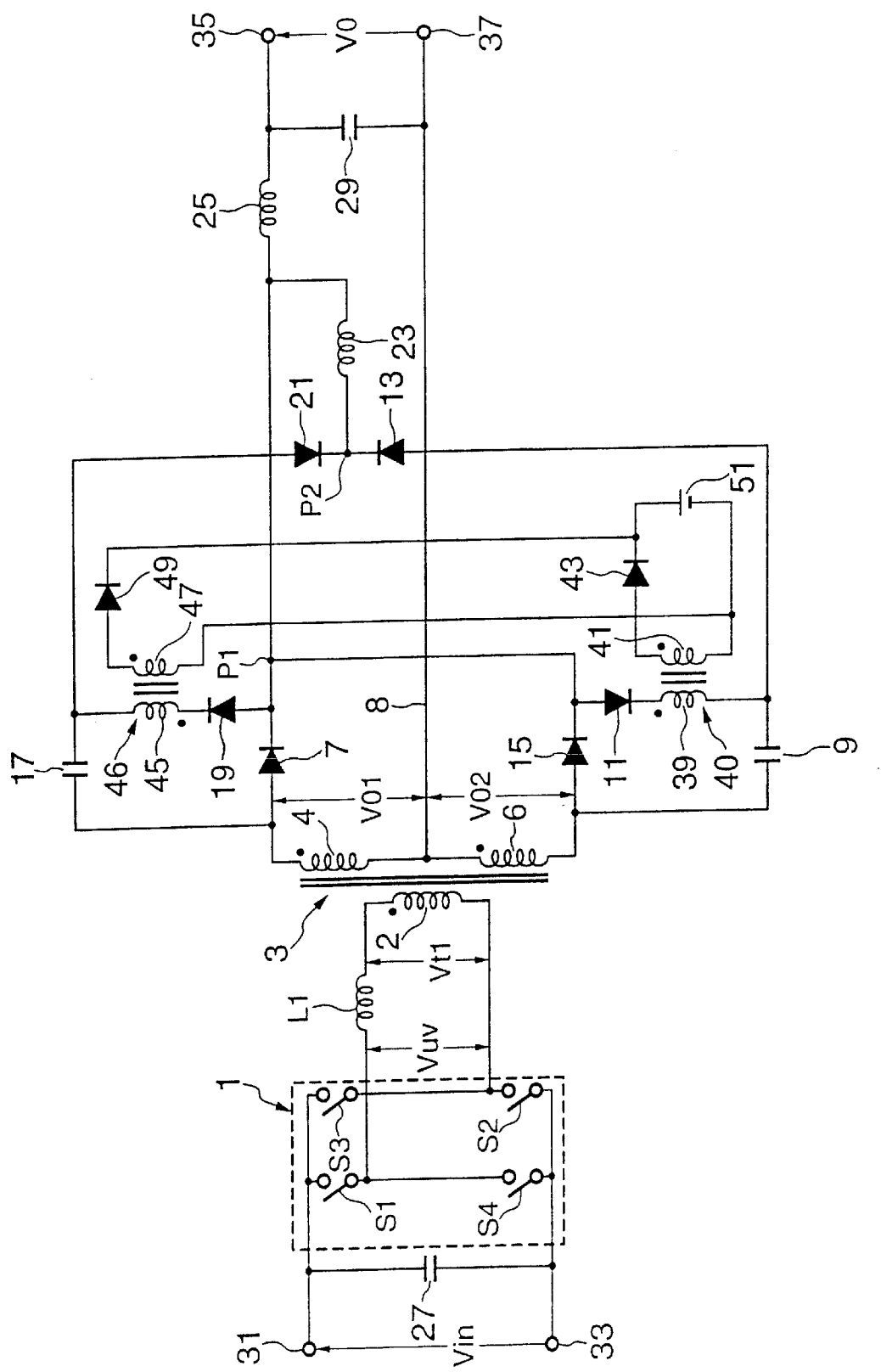
FIG. 13 is an electric circuit diagram showing another embodiment of the switching power supply according to the present invention.

FIG. 13 is an electric circuit diagram showing another embodiment of the switching power supply according to the present invention. In this figure, the same elements or components as those in FIGS. 5 through 12 will be defined by the same numerals. In the illustrated embodiment, the first snubber circuit includes a first transformer 40 and a first rectifier element 43. A winding 39 of the first transformer 40 is interposed between the connection point P1 of the first and second output rectifier diodes 7 and 15 and one end of the first capacitor 9. An anode of the first rectifier element 43 is connected to one end of a second winding 41 of the first transformer 40. The second snubber circuit includes a second transformer 46 and a second rectifier element 49. A first winding 45 of the second transformer 46 is interposed between the connection point P1 of the first and second output rectifier diodes 7 and 15 and one end of the second capacitor 17. An anode of the second rectifier element 49 is connected to one end of a second winding 47 of the second transformer 46.

The switching power supply shown in FIG. 13 further includes a voltage source 51. The voltage source 51 is connected to the other ends of the first and second rectifier elements 43 and 49 and the other ends of the second windings 41 and 47 provided in the first and second transformers 40 and 46.

Figure 14:
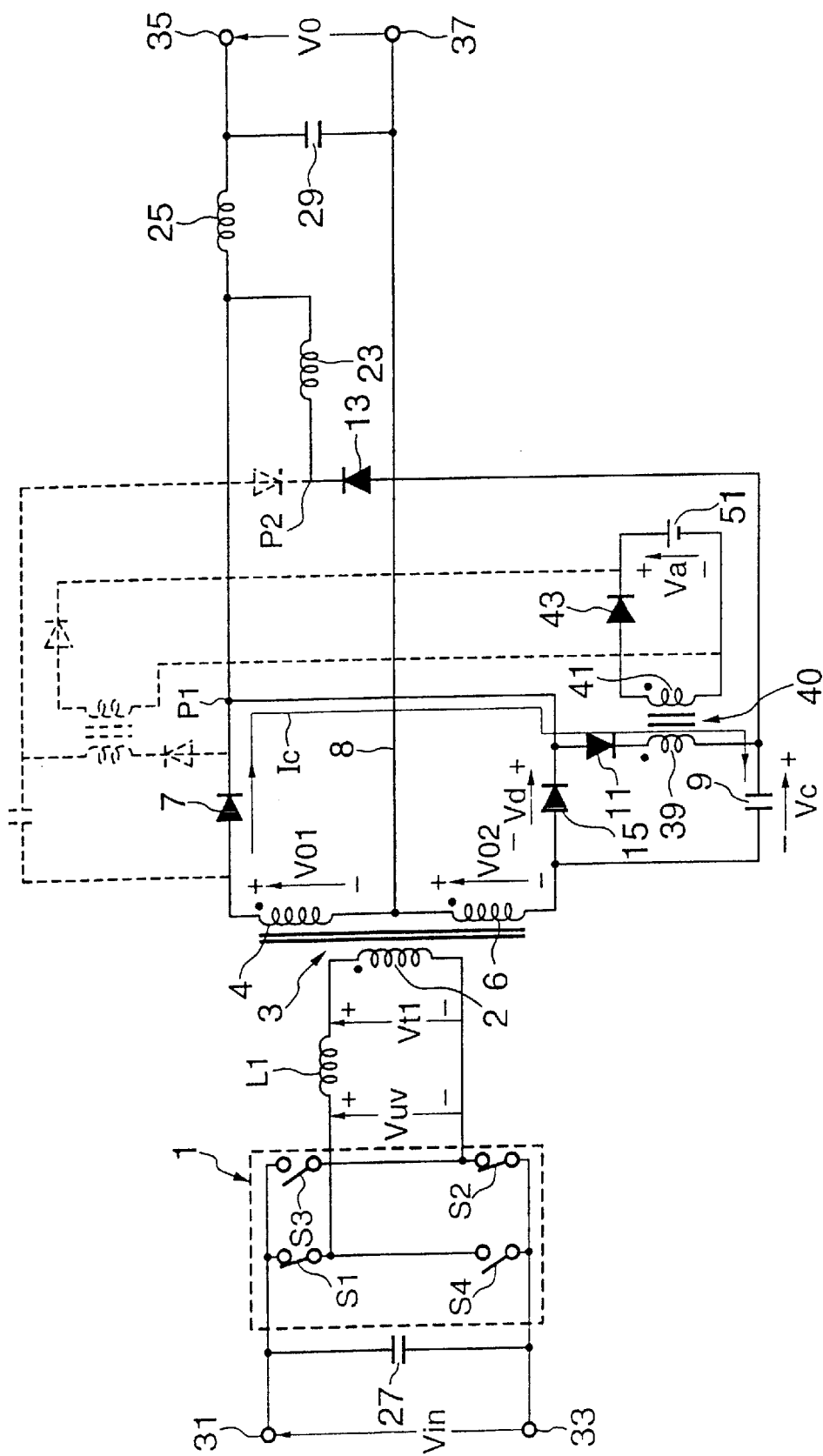
FIG. 14 is a view showing a part of the circuit operated when switching elements S1 and S2 of the switching circuit are turned on, in the switching power supply shown in FIG. 13.
Figure 15:
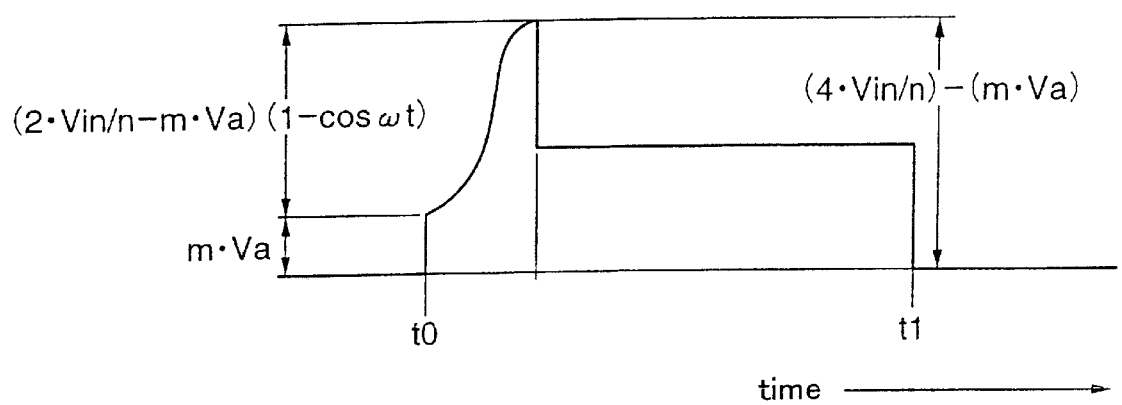
FIG. 15 is a view showing a reverse voltage waveform of a output rectifier diode obtained from the switching power supply shown in FIG. 13.

FIG. 14 is a view showing a part of the circuit operating when the switching elements S1 and S2 in the switching circuit 1 are turned on in the switching power supply shown in FIG. 13. FIG. 15 is a view showing a reverse voltage waveform of the output rectifier diode obtained from the switching power supply shown in FIG. 13.

As shown in FIG. 14, in the switching circuit 1, when the switching elements S1 and S2 are turned on, the voltages V01 and V02 appearing at the output windings 4 and 6 of the transformer 3 have the reverse direction to the second output rectifier diode 15 and the forward direction to the first output rectifier diode 7 and the first diode 11. Thus, as shown in FIG. 14, a charging loop Ic passing through the first output rectifier diode 7, the first diode 11, the first capacitor 9 and the output windings 4 and 6 of the transformer 3.

As described above with reference to FIGS. 7 and 8, in the charging loop Ic, the reverse voltage Vd is applied to the second output rectifier diode 15. If the ratio of the winging number m1 of the first winding 39 to the winding number m2 of the second winding 41 is arranged in m (m1/m2), and the DC voltage of the voltage source 51 is arranged in Va, the reverse voltage Vd applied to the second output rectifier diode 15 is determined as follows.

$$Vd=(2 \cdot Vin/n - m \cdot Va)(1-\cos\omega t)+m \cdot Va$$

where n is the coil ratio of the transformer 3 and Vin is the DC input voltage. Thus, the maximum value (peak value) Vdm of the reverse voltage Vd is determined as follows.

$$Vdm=4 \cdot Vin/n - m \cdot Va \quad (2)$$

As is apparent from the comparison of the formula (2) and the formula (1), according to the embodiment shown in FIG. 13, the reverse voltage Vd applied to the second output rectifier diode 15 may be more restrained than that of the embodiments shown in FIGS. 5 and 12. Thus, a diode having a lower forward voltage drop may be used as the second output rectifier diode 15. Therefore, the loss due to the second output rectifier diode 15 may be further reduced, which opens the way to obtain a low-energy-consumption and highly efficient switching power supply having a center tap type rectifier circuit.

While the detailed description will be omitted, in the cycle in which the switching elements S3 and S5 are turned on, the switching elements S1 and S2 being turned off, and the voltage appearing at the output windings 4 and 6 of the transformer 3 having the forward direction to the second output rectifier diode 15, the reverse voltage is applied to the first output rectifier diode 7. In this case, the second snubber circuit operates, and thereby the surge voltage applied to the first output rectifier diode 7 is restrained. Thus, the same results may be obtained in the first output rectifier diode 7.

Figure 16:
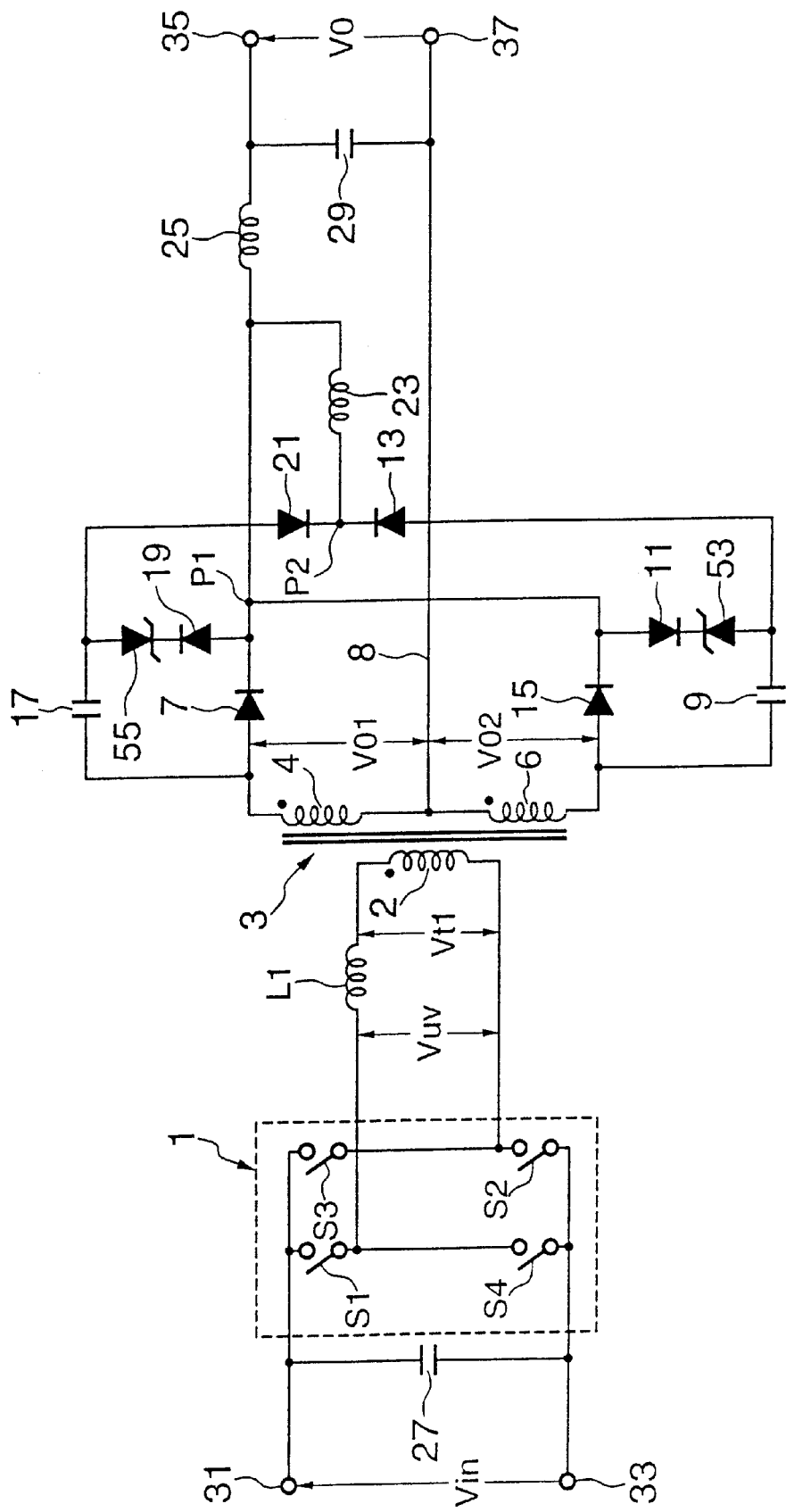
FIG. 16 is an electric circuit diagram showing another embodiment of the switching power supply according to the present invention.

FIG. 16 is an electric circuit diagram showing another embodiment of the switching power supply according to the present invention. In the figure, the same elements or components as those in FIGS. 5 through 12 will be defined by the same numerals. In this embodiment, the first snubber circuit includes a first zener diode 53. This first zener diode 53 is interposed between the connection point P1 of the first and second output rectifier diodes 7 and 15 and one end of the first capacitor 9. In the same manner, the second snubber circuit includes a second zener diode 55. The second zener diode 55 is interposed between the connection point P1 of the first and second output rectifier diodes 7 and 15 and one end of the second capacitor 17.

In this embodiment, the same surge voltage reduction effect as in the switching power supply shown in FIG. 13 may be obtained. Specifically, if the zener voltage of the first and second zener diodes 53 and 55 is arranged in Vz, the maximum value (peak value) Vdm of the reverse voltage Vd is determined as follows.

$$Vdm=4 \cdot Vin/n - Vz \quad (3).$$

Figure 17:
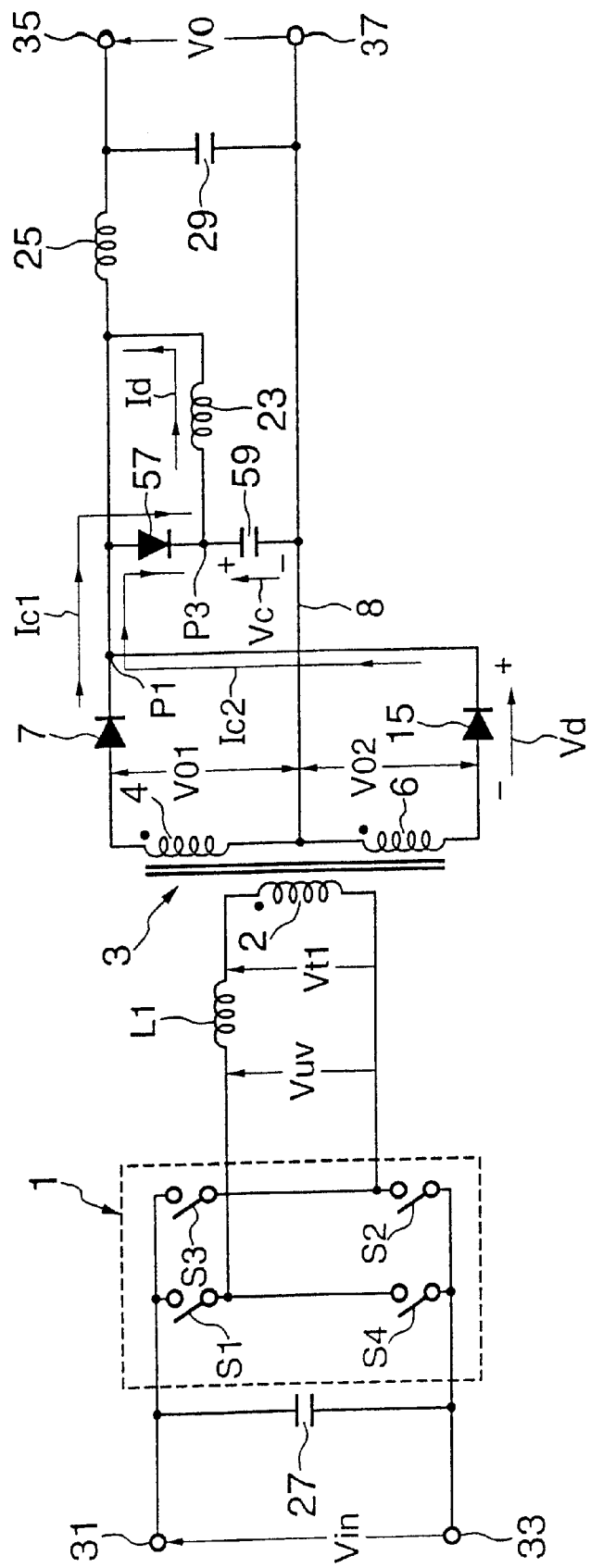
FIG. 17 is an electric circuit diagram showing another embodiment of the switching power supply according to the present invention.

FIG. 17 is an electric circuit diagram showing still another embodiment of the switching power supply according to the present invention. In the figure, the same elements or components as those in figures described above will be defined by the same numerals. In this embodiment, the snubber circuit simply includes a single snubber capacitor 59, a single snubber diode 57, and a single snubber inductor 23. The snubber capacitor 59 and the snubber diode 57 are connected in series with each other, and are connected between the connection point P1 of the first and second output rectifier diodes 7 and 15 and the center tap 8 of the transformer 3.

As one important feature of the present invention, the snubber inductor 23 in the snubber circuit is connected between the line connecting the snubber capacitor 59 and the snubber diode 57 and the input side of the output smoothing circuit. Specifically, one end of the snubber inductor 23 is connected to an end of the output choke coil 25 led to the first and second output rectifier diodes 7 and 15. The other end of the snubber inductor 23 is connected to the connection point P3 of the snubber capacitor 59 and the snubber diode 57.

The circuit operation of the switching power supply in this embodiment is approximately the same as the embodiment shown in FIG. 5 and the embodiment shown in FIG. 12. In the switching circuit 1, when the switching elements S1 and S2 are turned on, the voltage appearing at the output windings 4 and 6 of the transformer 3 has the reverse direction to the second output rectifier diode 15, and the forward direction to the first output rectifier diode 7 and the snubber diode 57. Thus, a charging loop Ic1 passing through the first output rectifier diode 7, the snubber diode 57, the snubber capacitor 59 and the output winding 4 of the transformer 3 is established. In the charging loop Ic1, an LC resonance circuit of the leakage inductance L1 of the transformer 3 and the capacitor 59 is established, and thereby the terminal voltage Vc of the capacitor 59 is increased in accordance with the waveform of the LC resonance voltage. The maximum value (peak value) Vdm of the reverse voltage Vd applied to the second output rectifier diode 15 corresponds to the value shown in the formula (1).

Thus, in the embodiment shown in FIG. 17, since the reverse voltage Vd applied to the second output rectifier diode 15 may also be restrained, the diode having a low forward voltage drop may be used as the second output rectifier diode 15. Thus, the loss due to the second output rectifier diode 15 may be reduced, and thereby a low-energy-consumption, highly efficient switching power supply having a center tap type rectifier circuit may be obtain. Further, the surge voltage applied to the second output rectifier diode 15 is restrained by the LC resonance effect, and thereby the low noise snubber circuit may be achieved.

When the switching elements S1 and S2 are turned off, the snubber inductor 23 forms a one-way discharging path Id for the snubber capacitor 59. Thus, when the switching elements S1 and S2 are turned off, the energy accumulated in the snubber capacitor 59 is regenerated on the load side through the one-way discharging path Id, which provides an enhanced efficiency. Since the snubber circuit simply includes the single snubber diode 57, the single snubber capacitor 59 and the single snubber inductor 23, the number of parts may be reduced and the device may be downsized. Further, in the embodiment shown in FIG. 17, the current passing through the snubber diode 57 in the snubber circuit and the snubber inductor 23 becomes extremely small, as with the embodiment shown in FIG. 5 and the embodiment shown in FIG. 12. Thus, the loss due to the forward voltage drop of the snubber diode 57 and the loss due to the DC resistance of the snubber inductor 23 in the snubber circuit are decrease to the extent that they may be substantially negligible. A low capacity, low power element may be used as the snubber diode 57 and inductor 23 of the snubber circuit, and the diode 19 and the inductor 23 in the snubber circuit may be downsized, and thereby a small size switching power supply may be provided.

While the detailed description will be omitted herein, in the cycle in which the switching elements S3 and S4 are turned on, the switching elements S1 and S2 being turned off, and the voltages V01 and V02 appearing at the output windings 4 and 6 of the transformer 3 having the forward direction to the second output rectifier diode 15, the reverse voltage is applied to the first output rectifier diode 7. In this case, the surge voltage applied to the first output rectifier diode 7 may be restrained in the same circuit operation as described above. Thus, the same results may be obtained in the first output rectifier diode 7. In case that the switching elements S3 and S4 are turned off, the same circuit operation is carried out as with the case that the switching elements S1 and S2 are turned off, and the same result may be obtained.

Figure 18:
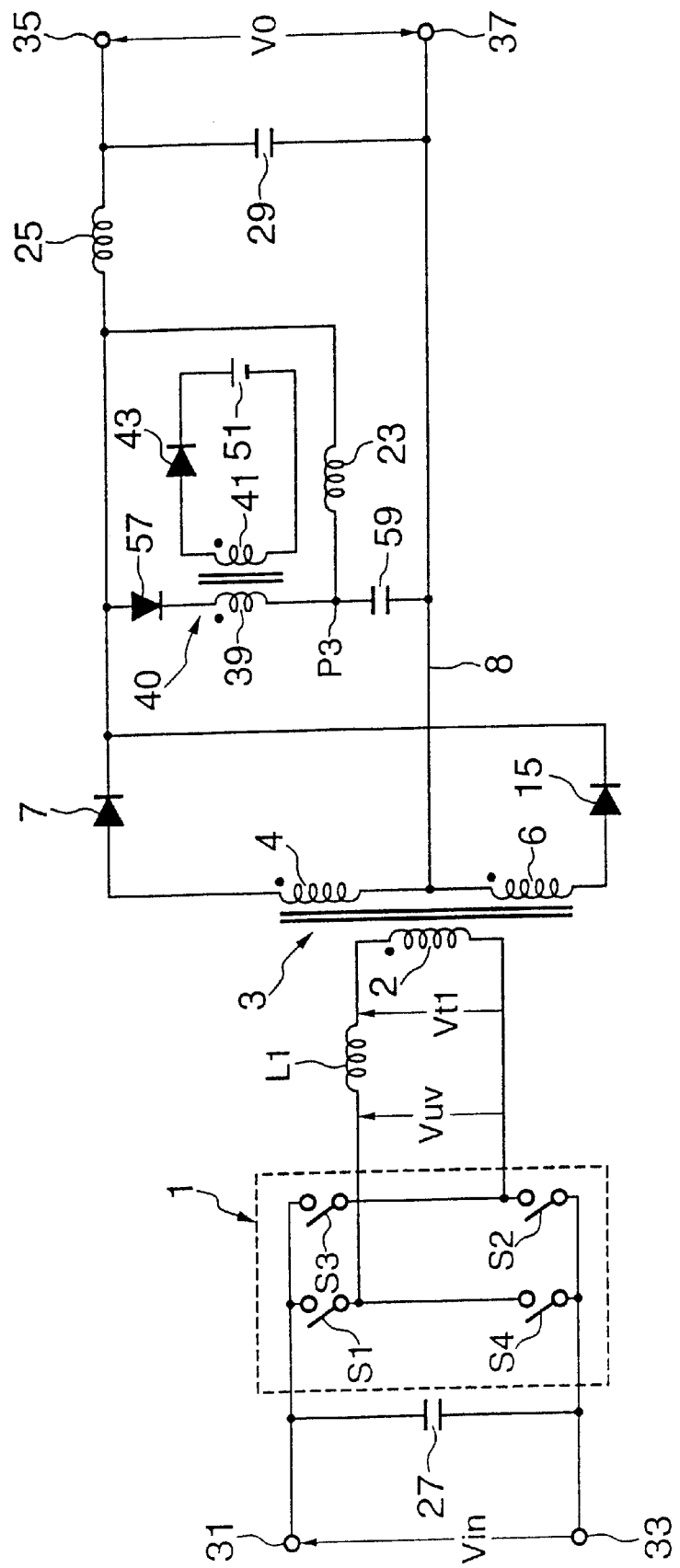
FIG. 18 is an electric circuit diagram showing another embodiment of the switching power supply according to the present invention.

FIG. 18 is an electric circuit diagram showing another embodiment of the switching power supply according to the present invention. In the figure, the same elements or components as those in FIG. 17 will be defined by the same numerals. The feature of the embodiment illustrated in FIG. 18 is that it includes the voltage source 51. The voltage source 51 is connected between the rectifier element 43 and the second winding 41 provided in the transformer 40. The first winding 39 of the transformer 40 is connected between the cathode of the snubber diode 57 and the connection point P3 of the snubber capacitor 59 and the snubber inductor 23. For the operation of the voltage source 51, it may refer to the embodiments illustrated in FIGS. 13 and 15.

Figure 19:
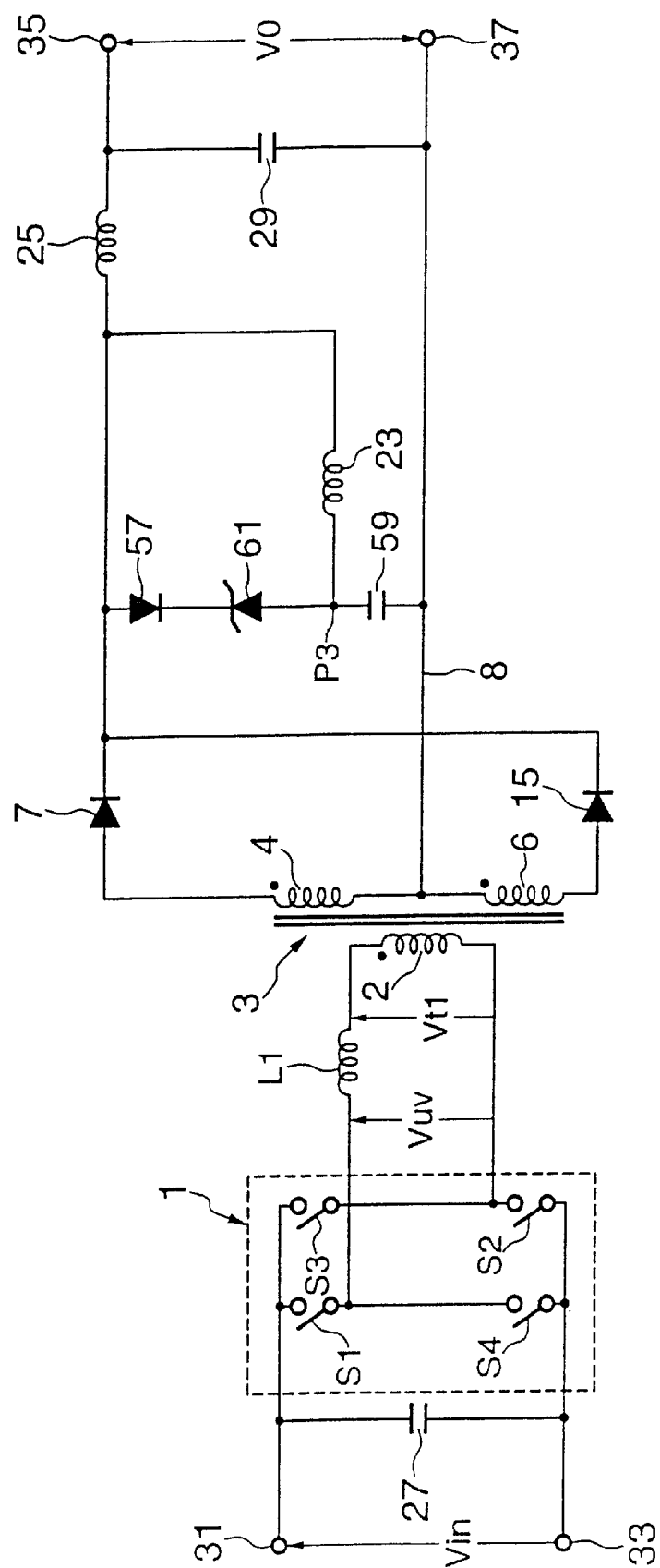
FIG. 19 is an electric circuit diagram showing another embodiment of the switching power supply according to the present invention.

FIG. 19 is an electric circuit diagram showing another embodiment of the switching power supply according to the present invention. In the figure, the same elements or components as those in the circuit shown in FIGS. 17 and 18 will be defined by the same numerals. The feature of the embodiment illustrated in FIG. 19 is that it includes a zener diode 61. The zener diode 61 is connected between the cathode of the diode 57 and the connection point P3 of the capacitor 59 and the inductor 23. For the operation of the zener diode 61, it may refer to the embodiment illustrated in FIG. 16.

Figure 20:
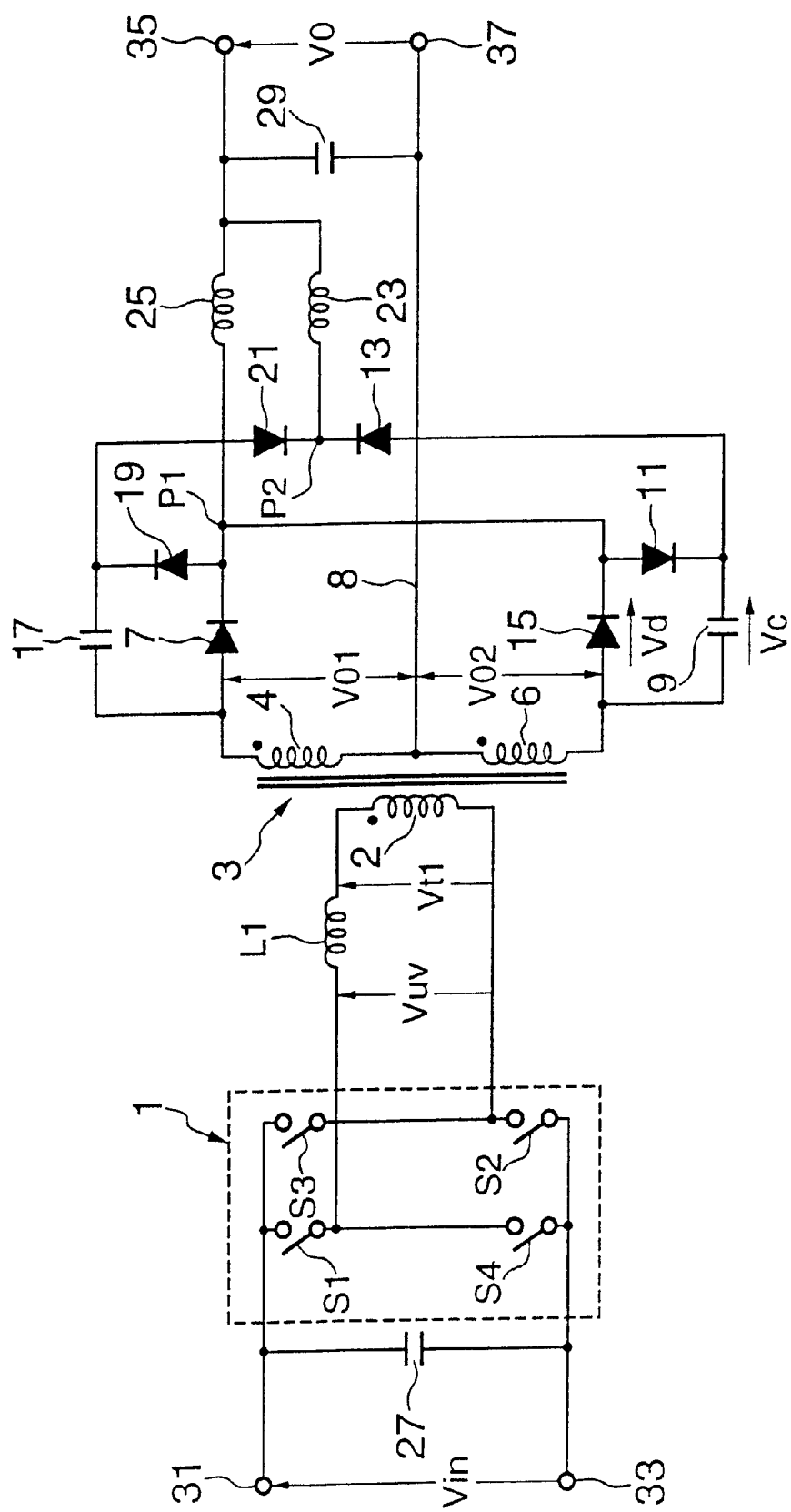
FIG. 20 is an electric circuit diagram of a switching power supply according to another embodiment of the present invention.

FIG. 20 is an electric circuit diagram showing the switching power supply according to another embodiment of the present invention. While this embodiment has approximately the same structure as that of the embodiment shown in FIG. 5, the shared, or common, snubber inductor 23 is provided as a substitute for the snubber inductors 231 and 232. The snubber inductor 23 is connected to the output side of the output smoothing circuit, or to the connection point between the choke coil 25 in the output smoothing circuit, the output smoothing capacitor 29 and the output terminal 35. This structure is the same as that of the circuit shown in FIG. 24, except the above point.

FIGS. 21 to 24 will be referred herein. The first and second snubber circuits have different operation timings, respectively, but have substantially the same structure and action. Thus, only the operation of the first snubber circuit will be described and the detailed description of the second snubber circuit will be omitted.

Figure 21:
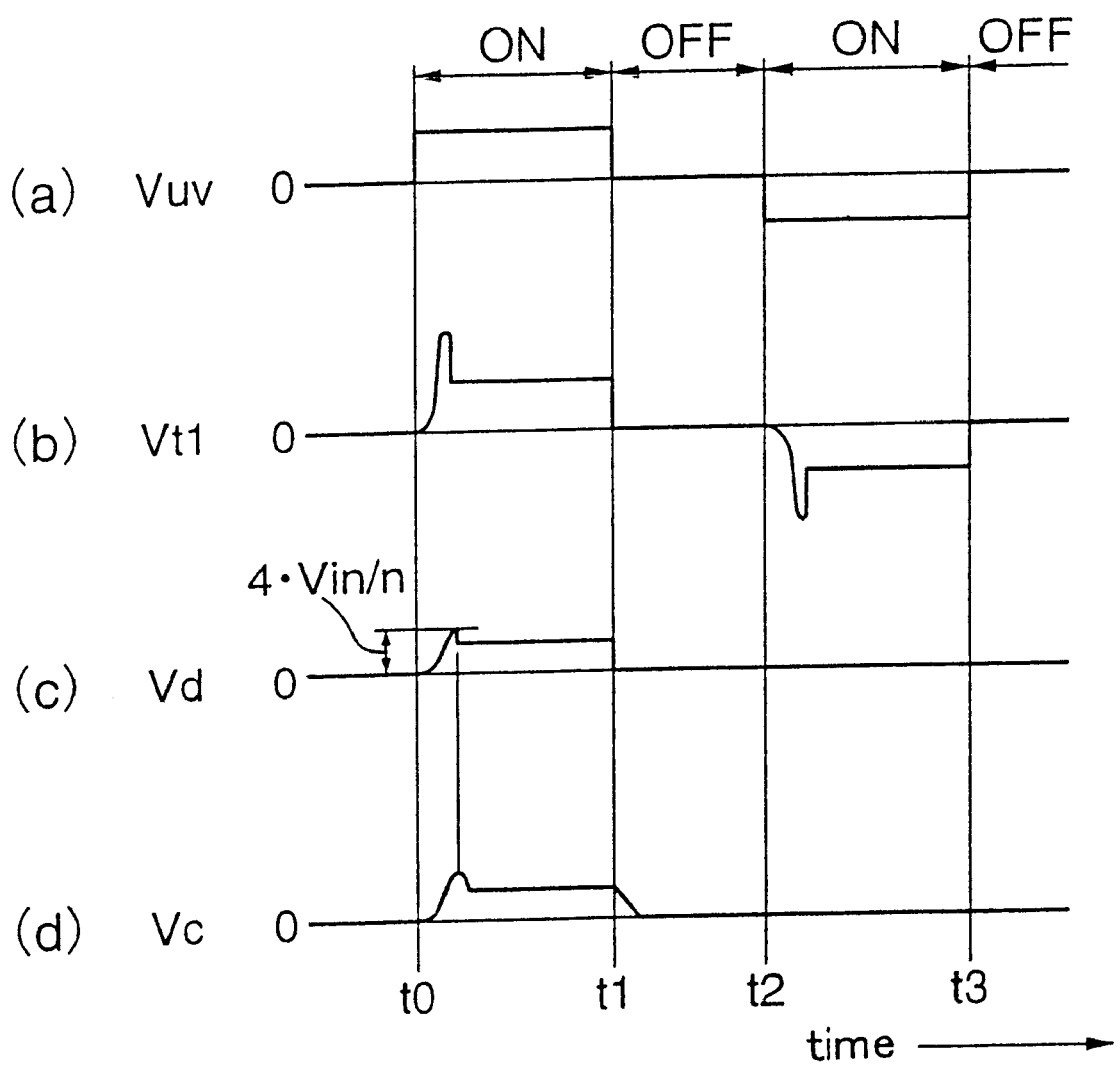
FIG. 21 is a chart showing a voltages waveform of each section in the switching power supply shown in FIG. 20.
Figure 22:
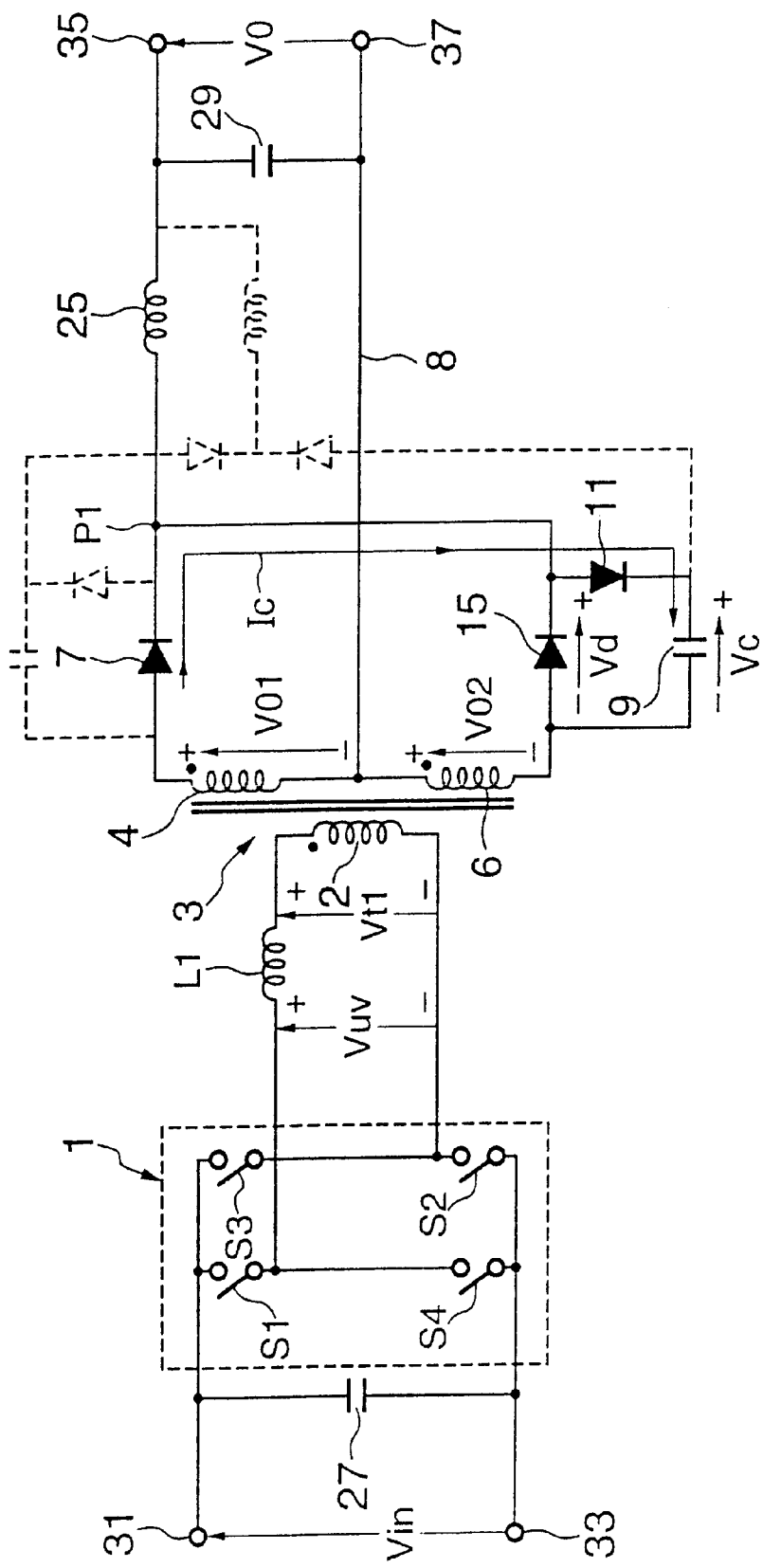
FIG. 22 is a view showing a part of the circuit operated when switching elements S1 and S2 of the switching circuit are turned on, in the switching power supply shown in FIG. 20.

As shown in FIG. 21 (a), when the switching circuit 1 is turned on at the time t0, the DC voltage Vuv appears at the output side of the switching circuit 1, and this DC voltage Vuv is supplied to the input winding 2 of the transformer 3. The voltage Vt1 shown in the input winding 2 of the transformer 3 has the waveform of the LC resonance voltage as shown in FIG. 21 (b). This voltage Vt1 is transferred to the output side of the transformer 3 by the transformer coupling between the input winding 2 and the output windings 4 and 6, FIG. 22 is an explanatory view of the circuit operation in this case. In the switching circuit 1 having the circuit structure shown in FIG. 20, when the switching elements S1 and S2 are turned on, the voltages V01 and V02 appearing at the output windings 4 and 6 of the transformer 3 have the forward direction to the first output rectifier diode 7. Thus, as shown in FIG. 22, a charging loop Ic passing through the first output rectifier diode 7, the first diode 11, the first capacitor 9 and the output windings 4 and 6 of the transformer 3 is established. In the charging loop Ic, the LC resonance circuit by the series inductance L1 of the transformer 3 and the first capacitor 9 is established, and thereby the terminal voltage Vc of the first capacitor 9 is increased in accordance with the waveform of the LC resonance voltage as shown in FIG. 21(d).

Figure 23:
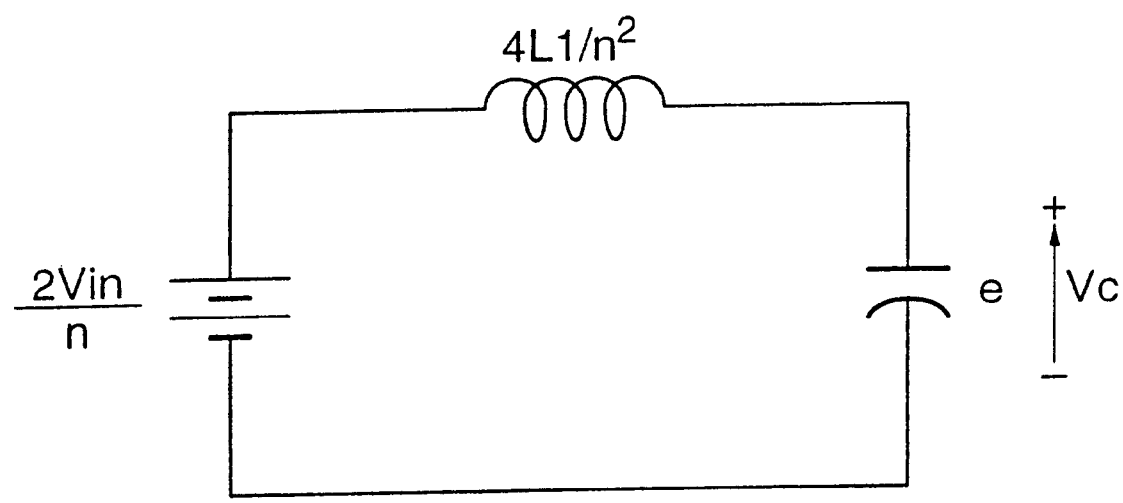
FIG. 23 is an equivalent circuit diagram in the operating state in FIG. 22.

FIG. 23 is an equivalent circuit diagram of the LC resonance circuit by the series inductance L1 of the transformer 3 and the first capacitor 9. In this equivalent circuit diagram, the terminal voltage Vc of the first capacitor 9 is determined as follows.

$$Vc = 2 \cdot Vin \cdot (1-\cos\omega t)/n.$$

where $\omega = 1/(4 \cdot L1 \cdot C/n^2)^{1/2}$.

In the cycle in which the first output rectifier diode 7 is conducted, the reverse voltage Vd is applied to the second output rectifier diode 15. Since the series circuit of the first capacitor 9 and the first diode 11 is connected in parallel with the second output rectifier diode 15, the reverse voltage Vd applied to the second output rectifier diode 15 becomes substantially equal to the terminal voltage Vc of the first capacitor 9 when the forward voltage drop of the first diode 11 is neglected. The terminal voltage Vc of the first capacitor 9 is increased in accordance with the LC resonance voltage waveform based on the leakage inductance of the transformer 3 and the first capacitor 9, as described above. Thus, the reverse voltage Vd applied to the second output rectifier diode 15 is restrained in the voltage determined by the LC resonance voltage.

From the aforementioned formula, the maximum value (peak value) Vdm of the reverse voltage Vd is determined as follows.

$$Vdm = 2 \cdot Vin \cdot (1 - \cos\pi)/n \quad (1)$$
$$= 4 \cdot Vin/n$$

As described above, since the reverse voltage Vd applied to the second output rectifier diode 15 may be restrained, a diode having a low forward voltage drop may be used as the second output rectifier diode 15. Thus, the loss due to the second output rectifier diode 15 is reduced, and thereby a low-energy-consumption, highly efficient center tap type switching power supply may be obtained. Further, the reverse voltage Vd applied to the second output rectifier diodes 7 and 15 is restrained by the LC resonance effect. Thus, a low noise snubber circuit may be restrained.

Figure 24:
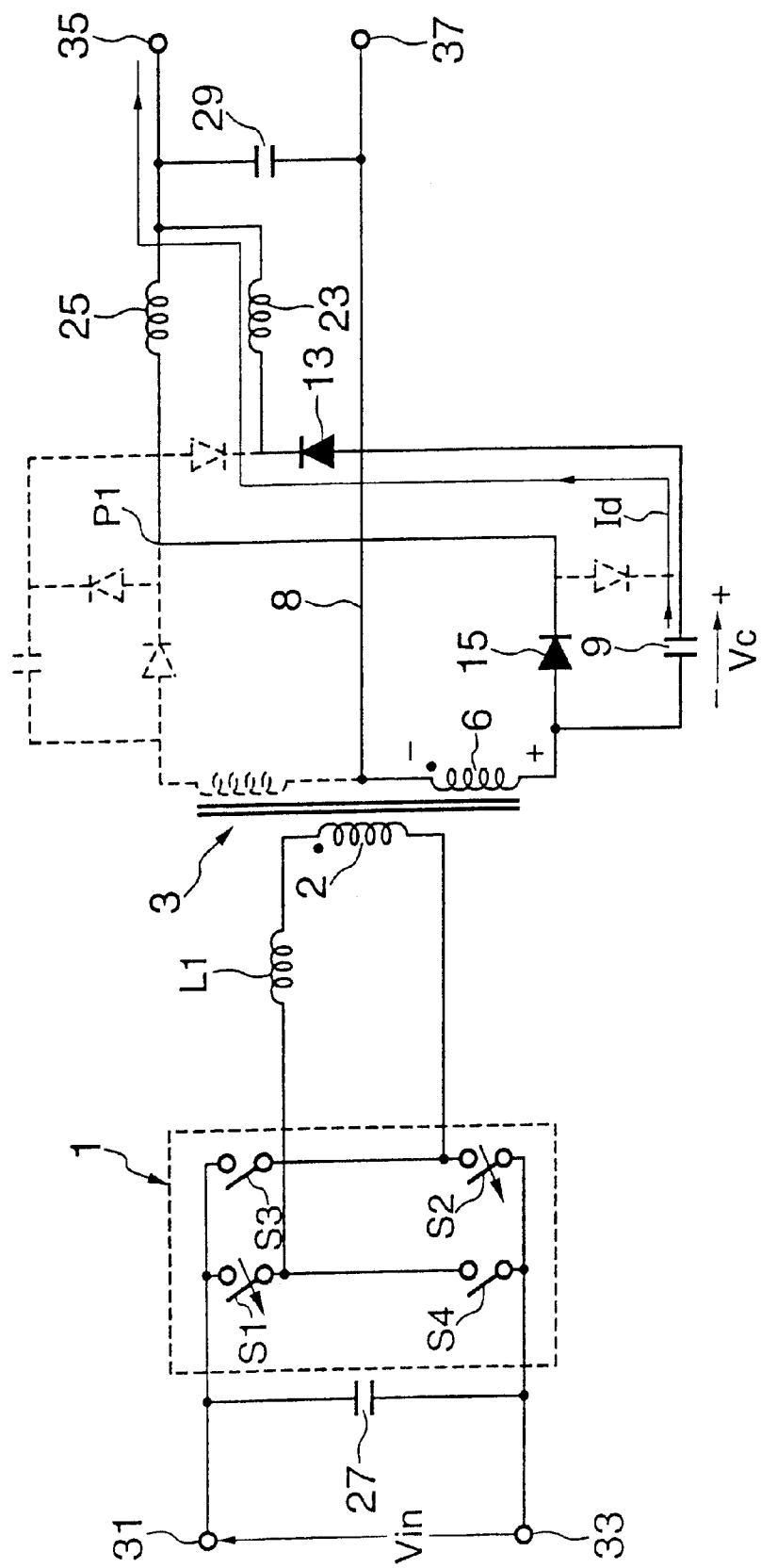
FIG. 24 is a view showing a part of the circuit operated when switching elements S1 and S2 of the switching circuit are turned off, in the switching power supply shown in FIG. 20.

As shown in FIG. 21 (a), the state when that the switching elements S1 and S2 are turned off at the time t1 will be described. FIG. 24 is an explanatory view of the circuit operation in this case. The snubber circuit includes the inductor 23. This inductor 23 has one end connected to the output side of the output smoothing circuits 25 and 29 and the other end led to the first snubber circuit, to form a one-way discharging path Id for the first capacitor 9. Thus, as shown in FIG. 24, when the switching elements S1 and S2 are turned off at the time t1, the energy accumulated in the first capacitor 9 is regenerated on the load side through the one-way discharging path Id, which may provide an enhanced efficiency. Since the inductor 23 is shared by the first and second snubber circuits, the number of parts is reduced, which may provide a downsized switching power supply. Further, as described above with reference to FIGS. 11 and 12, in this embodiment, the reverse voltage applied to the diode may be drastically lowered more than that in the conventional snubber circuit.

Figure 25:
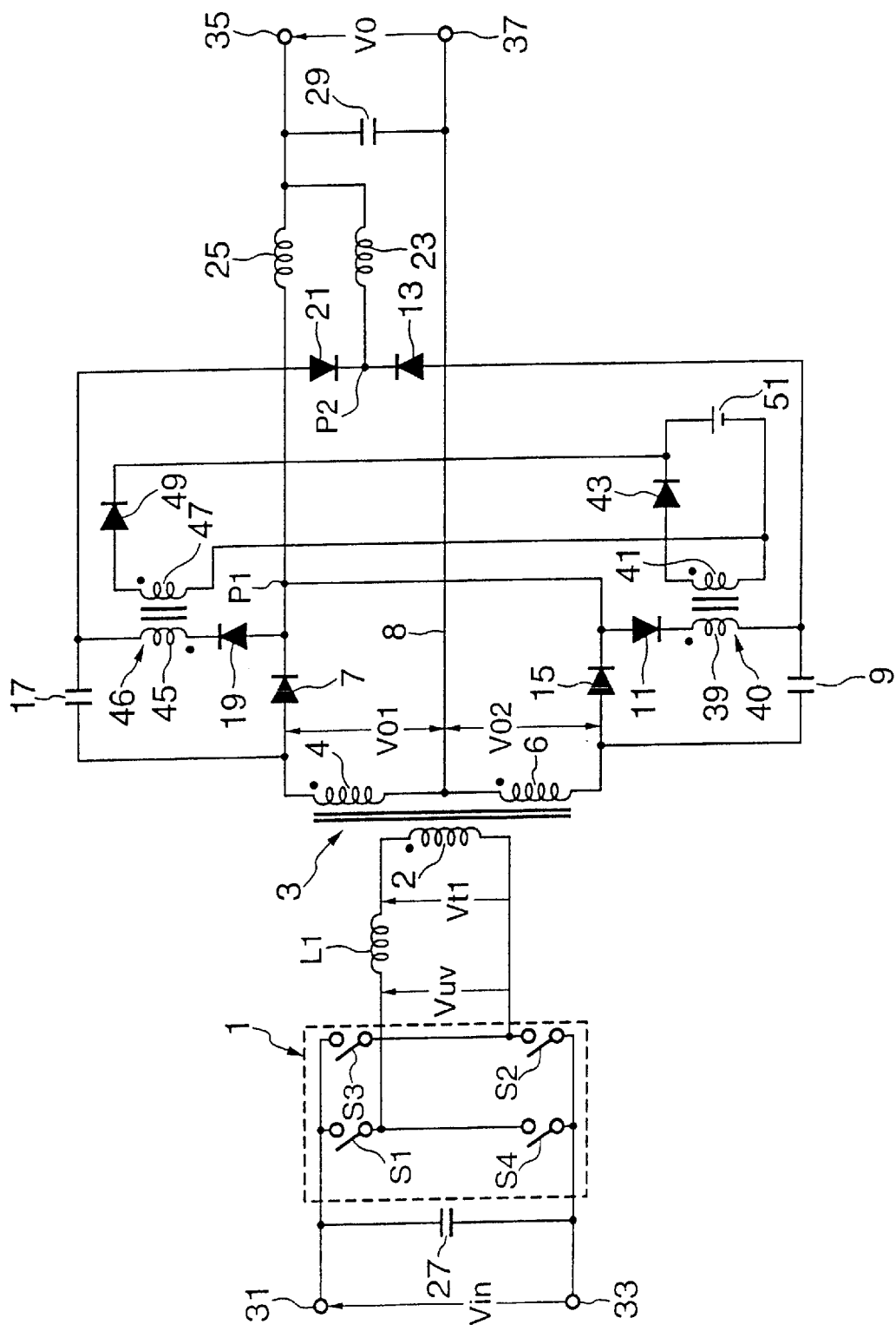
FIG. 25 is an electric circuit diagram showing another embodiment of the switching power supply according to the present invention.

FIG. 25 shows the embodiment of the present invention wherein the snubber inductor 23 is adapted to connect to the connection point of the choke coil 25 of the smoothing circuit, the output smoothing capacitor 29 and the output terminal 35 in the circuit shown in FIG. 13. The operation is essentially the same as that in the circuit shown in FIG. 13, and the energy regeneration from the snubber inductor 23 is the same as that in the operation described in conjunction with to FIGS. 20 to 24.

Figure 26:
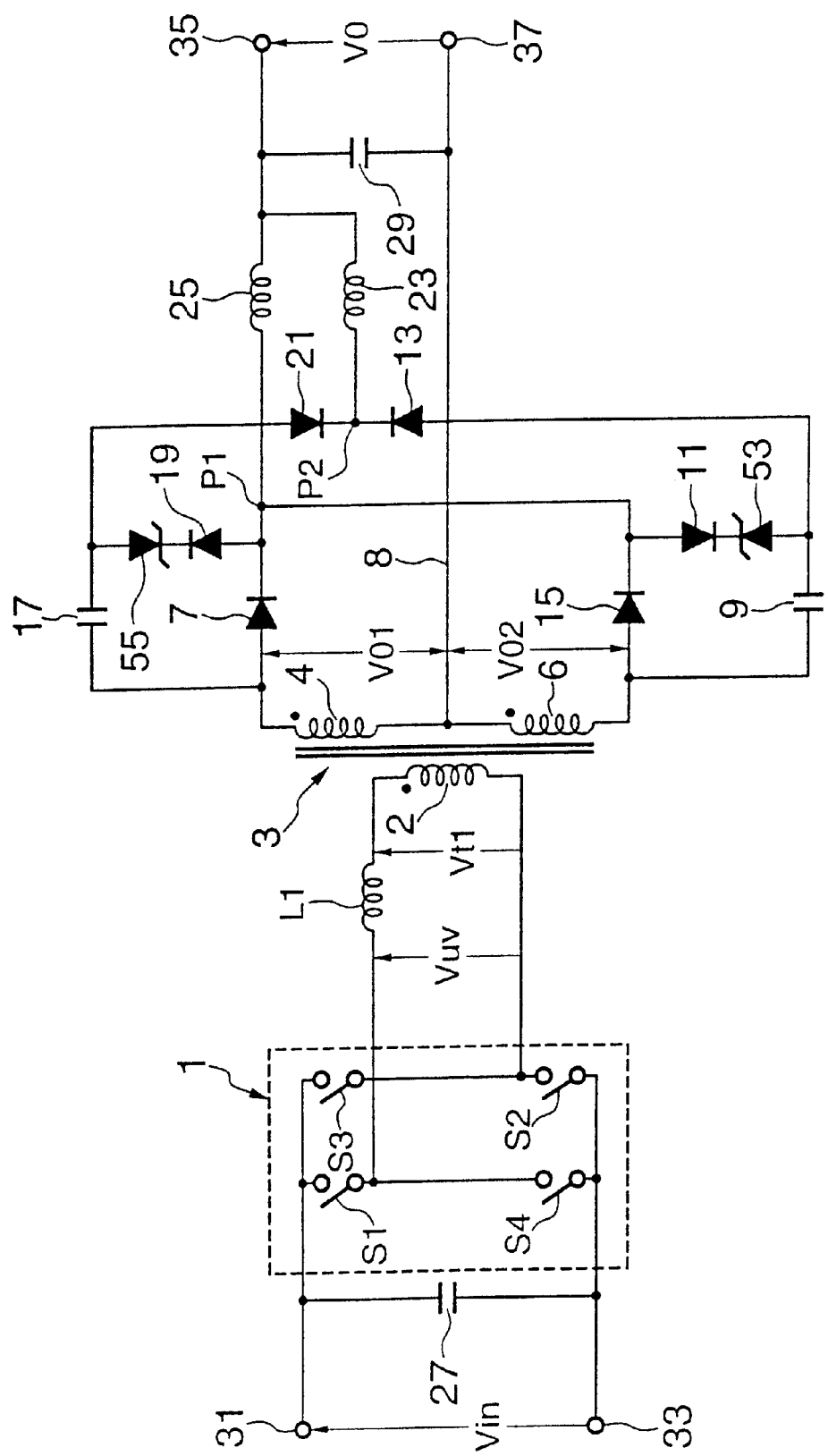
FIG. 26 is an electric circuit diagram showing another embodiment of the switching power supply according to the present invention.

FIG. 26 is an electric circuit diagram showing the embodiment of the switching power supply, provided by partially modifying the embodiment shown in FIG. 16. In the embodiment shown in FIG. 26, the only a different point from the embodiment in FIG. 16 is that the snubber inductor 23 is connected to the connection point between the choke coil 25 in the smoothing circuit, the output smoothing capacitor 29 and the output terminal 35.

Figure 27:
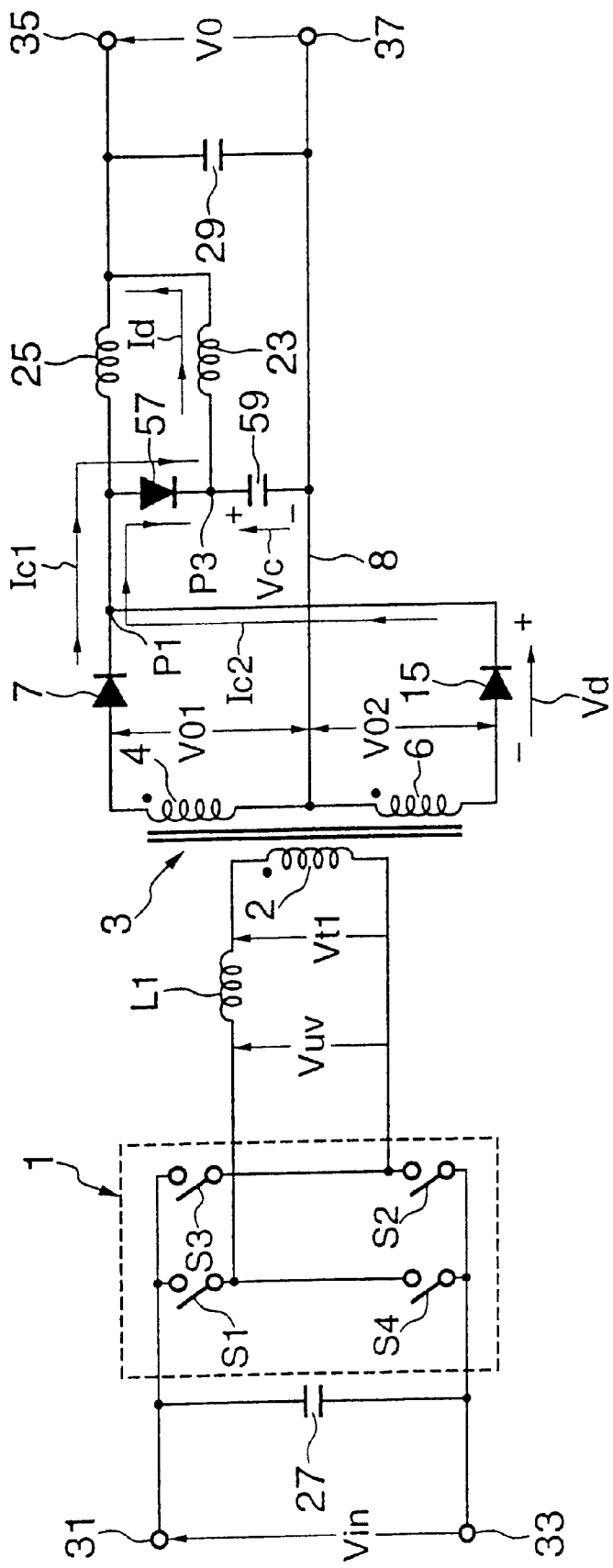
FIG. 27 is an electric circuit diagram showing another embodiment of the switching power supply according to the present invention.

FIG. 27 shows an embodiment of the switching power supply, wherein the snubber inductor 23 is connected to the connection point between the choke coil 25 in the smoothing circuit, the output smoothing capacitor 29 and the output terminal 35. The operation is essentially the same as that in the circuit shown in FIG. 17, and the energy regeneration from the snubber inductor 23 is the same as the operation described with reference to FIGS. 20 to 24.

Figure 28:
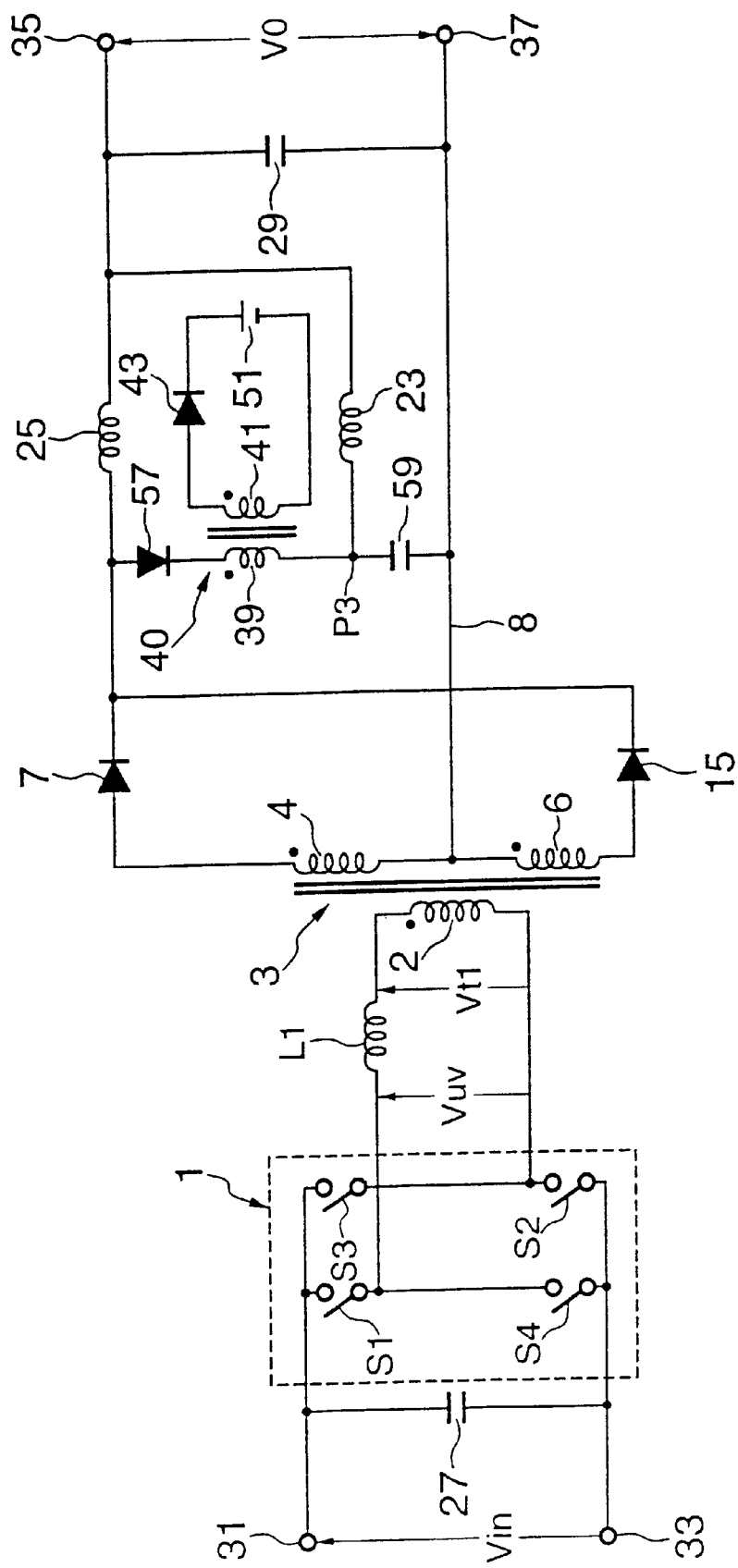
FIG. 28 is an electric circuit diagram showing another embodiment of the switching power supply according to the present invention.

FIG. 28 shows an embodiment of the switching power supply, wherein the snubber inductor 23 is connected to the connection point between the choke coil 25 in the smoothing circuit, the output smoothing capacitor 29 and the output terminal 35. The operation is essentially the same as that in the circuit shown in FIG. 18, and the energy regeneration from the snubber inductor 23 is the same as the operation described with reference to FIGS. 20 to 24.

Figure 29:
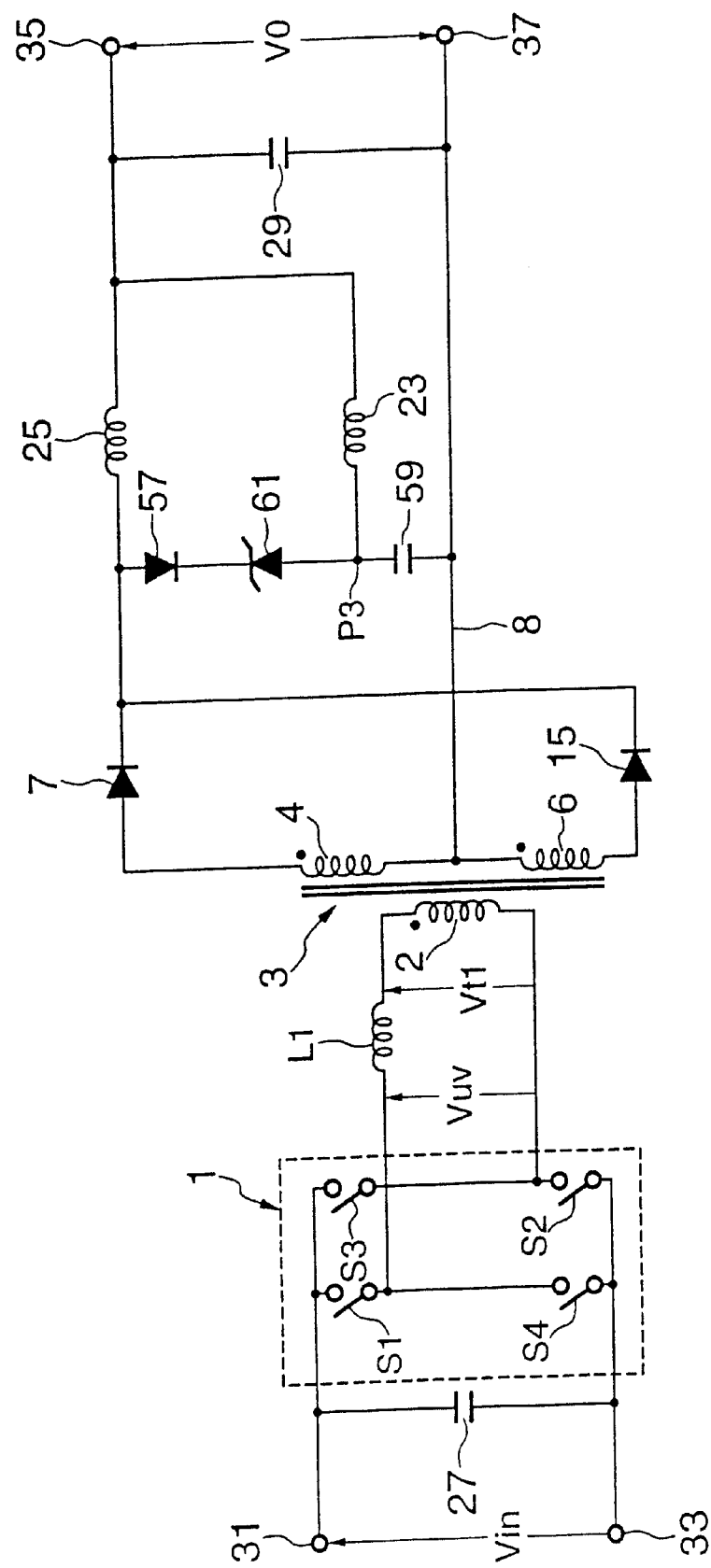
FIG. 29 is an electric circuit diagram showing another embodiment of the switching power supply according to the present invention.

FIG. 29 shows an embodiment of the switching power supply, wherein the snubber inductor 23 is connected to the connection point between the choke coil 25 in the smoothing circuit, the output smoothing capacitor 29 and the output terminal 35. The operation is essentially the same as that in the circuit shown in FIG. 19, and the energy regeneration from the snubber inductor 23 is the same as the operation described with reference to FIGS. 20 to 24.

We claim:

1. A switching power supply comprising:
   a transformer including an input winding and an output winding;
   a switching circuit connected to said input winding of said transformer, and switching a DC input voltage supplied to said input winding;
   an output rectifier circuit including at least one output rectifier diode, said output rectifier diode having one electrode which is connected to one end of said output winding;
   an output smoothing circuit having an input side connected to the other electrode of said output rectifier diode;
   a snubber circuit including a snubber inductor, a snubber capacitor and a snubber diode, said snubber capacitor and said snubber diode being connected in series with each other, wherein said snubber capacitor and said snubber diode connected in series with each other are connected in parallel with said output rectifier diode and to a position between said output winding and the other electrode of said output rectifier diode, said snubber inductor having one end non-switchably coupled to said snubber capacitor and said snubber diode, and the other end coupled to said input side of said output smoothing circuit.

2. A switching power supply as defined in claim 1, wherein said output rectifier circuit includes a first output rectifier diode and a second output rectifier diode, said first output rectifier diode having one electrode connected to one end of said output winding, said second output rectifier diode having one electrode connected to said other end of said output winding, said one end of said second output rectifier diode having the same polarity as that of said one end of said first output rectifier diode, wherein the other electrodes of said first and second output rectifier diodes each having the same polarity are connected with each other.

3. A switching power supply as defined in claim 2, wherein said output winding of said transformer includes a center tap, wherein said center tap and both ends of said output winding serve as output ends.

4. A switching power supply as defined in claim 3, wherein the input side of said output smoothing circuit is connected to a connection point of said first and second output rectifier diodes and said center tap, and the output side of said output smoothing circuit is connected to a pair of output terminals.

5. A switching power supply as defined in claim 3, wherein said snubber circuit includes a first snubber circuit, and a second snubber circuit, wherein
said first snubber circuit has a first snubber capacitor and a first snubber diode, wherein said first snubber capacitor and said first snubber diode are coupled in series with each other to form a series circuit, said series circuit being connected in parallel with said first output rectifier diode so as to allow said first snubber diode to have a reverse polarity to said first output rectifier diode, and
said second snubber circuit includes a second snubber capacitor and a second snubber diode, wherein said second snubber capacitor and said second snubber diode are coupled in series with each other, and connected in parallel with said second output rectifier diode so as to allow said second snubber diode to have a reverse polarity to said second output rectifier diode.

6. A switching power supply as defined in claim 5, wherein said snubber inductor comprises a first snubber inductor in said first snubber circuit and a second snubber inductor in said second snubber circuit.

7. A switching power supply as defined in claim 5, wherein said snubber inductor is shared by said first and second snubber circuits.

8. A switching power supply as defined in claim 7, wherein
said first snubber circuit further includes a third snubber diode, said third snubber diode having one end connected to one end of said first snubber capacitor connected to said first snubber diode,
said second snubber circuit further includes a fourth snubber diode, said fourth snubber diode including one end which has the same polarity as that of said one end of said third snubber diode, wherein said one end of said fourth snubber diode is connected to one end of said second snubber capacitor led to said second snubber diode, and the other end of said fourth snubber diode is connected to the other end of said third snubber diode having the same polarity as that of said the other end of said fourth snubber diode, and
said snubber inductor being connected between a connection point of said third and fourth snubber diodes and said input side of said output smoothing circuit.

9. A switching power supply as defined in claim 5, wherein
said first snubber circuit further includes a first transformer and a first rectifier element, wherein said first transformer has a first winding interposed between a connection point of said first and second output rectifier diodes and one end of said first snubber capacitor, and said first rectifier element has one end connected to one end of a second winding of said first transformer, and said second snubber circuit further includes a second transformer and a second rectifier element, wherein said second transformer has a first winding interposed between a connection point of said first and second output rectifier diodes and one end of said second snubber capacitor, and said second rectifier element having one end connected to one end of a second winding of said second transformer, wherein a voltage source is provided between respective other ends of said first and second rectifier elements and respective other ends of second windings of said first and second transformers.

10. A switching power supply as defined in claim 5, wherein
said first snubber circuit further includes a first zener diode interposed between a connection point of said first and second output rectifier diodes and one end of said first snubber capacitor, and
said second snubber circuit further includes a second zener diode interposed between a connection point of said first and second output rectifier diodes and one end of said second snubber capacitor.

11. A switching power supply as defined in claim 3, wherein said snubber capacitor and snubber diode of said snubber circuit are connected between a connection point of said first and second output rectifier diodes and said center tap.

12. A switching power supply as defined in claim 1, wherein
said output smoothing circuit further includes a choke coil, and
said snubber inductor of said snubber circuit has one end connected to the input side of said choke coil.

13. A switching power supply comprising:
a transformer having an input winding, an output winding, and a center tap provided in said output winding;
a switching circuit connected to said input winding of said transformer and switching a DC input voltage supplied to said input winding;
an output rectifier circuit including a first output rectifier diode having one end connected to one end of said transformer, and a second output rectifier diode having one end connected to the other end of said transformer, said one end of said second output rectifier diode having the same polarity as that of said one end of said first output rectifier diode, wherein the other ends of said first and second output rectifier diodes each having the same polarity are connected to each other;
an output smoothing circuit having an input side coupled to a connection point between said first and second output rectifier diodes and said center tap of said transformer, and an output side connected to a pair of output terminals; and
a snubber circuit comprising a first snubber circuit, a second snubber circuit, and a snubber inductor,
said first snubber circuit including a first snubber capacitor and a first snubber diode, wherein said first snubber capacitor and said first snubber diode are connected in series with each other to form a series circuit, wherein said series circuit is connected in parallel with said first output rectifier diode so as to allow said first snubber diode to have a reverse polarity to said first output rectifier diode,
said second snubber circuit including a second snubber capacitor and a second snubber diode, wherein said second snubber capacitor and said second snubber diode are connected in series with each other to form a series circuit, wherein said series circuit is connected in parallel with said second output rectifier diode so as to allow said second snubber diode to have a reverse polarity to said second output rectifier diode, and said snubber inductor having one end coupled to the output side of said smoothing circuit and the other end non-switchably coupled to said first and second snubber circuits to form a one-way discharging path for said first and second capacitors.

14. A switching power supply as defined in claim 13, wherein said first snubber circuit further includes a third snubber diode, said third snubber diode having one end connected to one end of said first snubber capacitor and to said first snubber diode, said second snubber circuit further includes a fourth snubber diode, said fourth snubber diode having one end connected to one end of said second snubber capacitor and to said second snubber diode, and the other end having the same polarity as that of the other end of said third snubber diode and connected to said the other end of said third snubber diode, and said other end of said snubber inductor is connected to a connection point of said third and fourth snubber diodes.

15. A switching power supply as defined in claim 13, wherein said first snubber circuit further includes a first snubber transformer and a first snubber rectifier element, wherein said first snubber transformer has a first winding interposed between a connection point of said first and second output rectifier diodes and one end of said first snubber capacitor, and said first rectifier element has one end connected to one end of a second winding of said first snubber transformer, said second snubber circuit further includes a second snubber transformer and a second snubber rectifier element, wherein said second snubber transformer has a first winding interposed between a connection point of said first and second output rectifier diodes and one end of said second snubber capacitor, and said second snubber rectifier element having one end connected to one end of a second winding of said second snubber transformer, and said switching power supply further includes a voltage power source, wherein a voltage source is connected to respective other ends of said first and second snubber rectifier elements and respective other ends of said second windings provided in said first and second snubber transformers.

16. A switching power supply as defined in claim 13, wherein said first snubber circuit further includes a first zener diode interposed between a connection point of said first and second output rectifier diodes and one end of said first snubber capacitor, and said second snubber circuit further includes a second zener diode interposed between a connection point of said first and second output rectifier diodes and one end of said second snubber capacitor.

17. A switching power supply comprises:

a transformer having an input winding, an output winding, and a center tap provided in said output winding;

a switching circuit connected to said input winding of said transformer and switching a DC input voltage supplied to said input winding;

an output rectifier circuit including a first output rectifier diode having one end connected to one end of said transformer, and a second output rectifier diode having one end connected to the other end of said transformer, said one end of said second output rectifier diode having the same polarity as that of said one end of said first output rectifier diode, wherein the other ends of said first and second output rectifier diodes each having the same polarity are connected with each other;

an output smoothing circuit having an input side connected to a connection point between said first and second output rectifier diodes and said center tap of said transformer, and an output side led to a pair of output terminals; and a snubber circuit including a single snubber capacitor, a single snubber diode, and a single snubber inductor, said snubber capacitor and said snubber diode being connected in series with each other and connected between a connection point of said first and second output rectifier diodes and said center tap, said snubber inductor having one end coupled to the output side of said smoothing circuit and the other end non-switchably coupled to a connection point between said snubber capacitor and said snubber diode.

18. A switching power supply comprising:

a transformer including an input winding and an output winding, said output winding including a center tap, said center tap and both ends of said output winding serving as output ends;

a switching circuit connected to said input winding of said transformer, and switching a DC input voltage supplied to said input winding;

an output rectifier circuit including a first output rectifier diode and a second output rectifier diode, said first output rectifier diode having one electrode connected to one end of said output winding, said second output rectifier diode having one electrode connected to said other end of said output winding, said one end of said second output rectifier diode having the same polarity as that of said one end of said first output rectifier diode, wherein tile other electrodes of said first and second output rectifier diodes each having the same polarity are connected with each other;

an output smoothing circuit having an input side connected to the other electrode of said first and second output rectifier diodes;

a snubber circuit including a snubber inductor, a first snubber circuit, and a second snubber circuit, wherein said first snubber circuit comprises a first snubber capacitor, a first snubber diode, a first transformer and a first rectifier element, wherein said first snubber capacitor and said first snubber diode are coupled in series will each other to form a series circuit, said series circuit being connected in parallel with said first output rectifier diode so as to allow said first snubber diode to have a reverse polarity to said first output rectifier diode, wherein said first transformer has a first winding interposed between a connection point of said first and second output rectifier diodes and one end of said first snubber capacitor, and said first rectifier element has one end connected to one end of a second winding of said first transformer, and said second snubber circuit includes a second snubber capacitor, a second snubber diode, a second transformer and a second rectifier element, wherein said second snubber capacitor and said second snubber diode are coupled in series with each other, and connected in parallel with said second output rectifier diode so as to allow said second snubber diode to have a reverse polarity to said second output rectifier diode, wherein said second transformer has a first winding interposed between a connection point of said first and second output rectifier diodes and one end of said second snubber capacitor, and said second rectifier element having one end connected to one end of a second winding of said second transformer, wherein a voltage source is provided between respective other ends of said first and second rectifier elements and respective other ends of said second windings of said first and second transformers, said snubber inductor having one end coupled to said first and second snubber capacitors and said first windings of said first and second transformers, and the other end coupled to the input side of said output smoothing circuit.

19. A switching power supply comprising:

a transformer including an input winding and an output winding, said output winding including a center tap, said center tap and both ends of said output winding serving as output ends;

a switching circuit connected to said input winding of said transformer, and switching a DC input voltage supplied to said input winding;

an output rectifier circuit including a first output rectifier diode and a second output rectifier, said first output rectifier diode having one electrode connected to one end of said output winding, said second output rectifier diode having one electrode connected to said other end of said output winding, said one end of said second output rectifier diode having the same polarity as that of said one end of said first output rectifier diode, wherein the other electrodes of said first and second output rectifier diodes each having the same polarity are connected with each other;

an output smoothing circuit having an input side connected to the other electrode of said first and second output rectifier diodes;

a snubber circuit including a snubber inductor, a first snubber circuit, and a second snubber circuit, wherein said first snubber circuit includes a first snubber capacitor, a first snubber diode and a first zener diode, wherein said first snubber capacitor and said first snubber diode are coupled in series with each other to form a series circuit, said series circuit being connected in parallel with said first output rectifier diode so as to allow said first snubber diode to have a reverse polarity to said first output rectifier diode, said first zener diode interposed between said first snubber diode and one end of said first snubber capacitor, and said second snubber circuit includes a second snubber capacitor, a second snubber diode and a second zener diode, wherein said second snubber capacitor and said second snubber diode are coupled in series with each other, and connected in parallel with said second output rectifier diode so as to allow said second snubber diode to have a reverse polarity to said second output rectifier diode, said second zener diode interposed between said second snubber diode and one end of said second snubber capacitor, said snubber inductor having one end coupled to said first and second snubber capacitors and said first and second zener diodes, and the other end coupled to the input side of said output smoothing circuit.

20. A switching power supply comprising:

a transformer having an input winding, an output winding, and a center tap provided in said output winding;

a switching circuit connected to said input winding of said transformer and switching a DC input voltage supplied to said input winding;

an output rectifier circuit including a first output rectifier diode having one end connected to one end of said transformer, and a second output rectifier diode having one end connected to the other end of said transformer, said one end of said second output rectifier diode having the same polarity as that of said one end of said first output rectifier diode, wherein the other ends of said first and second output rectifier diodes each having the same polarity are connected to each other;

an output smoothing circuit having an input side connected to a connection point between said first and second output rectifier diodes and said center tap of said transformer, and an output side connected to a pair of output terminals; and a snubber circuit comprising a first snubber circuit, a second snubber circuit, and a snubber inductor, said first snubber circuit including a first snubber capacitor, a first snubber diode and a third snubber diode, wherein said first snubber capacitor and said first snubber diode are connected in series with each other to form a series circuit, wherein said series circuit is connected in parallel with said first output rectifier diode so as to allow said first snubber diode to have a reverse polarity to said first output rectifier diode, said third snubber diode having one end connected to one end of said first snubber capacitor and to said first snubber diode, said second snubber circuit including a second snubber capacitor, a second snubber diode and a fourth snubber diode, wherein said second snubber capacitor and said second snubber diode are connected in series with each other to form a series circuit, wherein said series circuit is connected in parallel with said second output rectifier diode so as to allow said second snubber diode to have a reverse polarity to said second output rectifier diode, said fourth snubber diode having one end connected to one end of said second snubber capacitor and to said second snubber diode, and the other end having the same polarity as that of the other end of said third snubber diode and connected to said the other end of said third snubber diode, and said snubber inductor having one end coupled to the output side of said smoothing circuit and the other end coupled to said first and second snubber circuits to form a one-way discharging path For said first and second capacitors, said other end of said snubber inductor being connected to a connection point of said third and fourth snubber diodes.

21. A switching power supply comprising:

a transformer having an input winding, an output winding, and a center tap provided in said output winding;

a switching circuit connected to said input winding of said transformer and switching a DC input voltage supplied to said input winding;

an output rectifier circuit including a first output rectifier diode having one end connected to one end of said transformer, and a second output rectifier diode having one end connected to the other end of said transformer, said one end of said second output rectifier diode having the same polarity as that of said one end of said first output rectifier diode, wherein the other ends of said first and second output rectifier diodes each having the same polarity are connected to each other;

an output smoothing circuit having an input side connected to a connection point between said first and second output rectifier diodes and said center tap of said transformer, and an output side connected to a pair of output terminals; and a snubber circuit comprising a first snubber circuit, a second snubber circuit, and a snubber inductor, said first snubber circuit including a first snubber capacitor, a first snubber diode, a first snubber transformer and a first snubber rectifier element, wherein said first snubber capacitor and said first snubber diode are connected in series with each other to form a series circuit, wherein said series circuit is coupled in parallel with said first output rectifier diode so as to allow said first snubber diode to have a reverse polarity to said first output rectifier diode, said first snubber transformer having a first winding interposed between a connection point of said first and second output rectifier diodes and one end of said first snubber capacitor, and said first rectifier element has one end connected to one end of a second winding of said first snubber transformer, said second snubber circuit including a second snubber capacitor, a second snubber diode, a second snubber transformer and a second snubber rectifier element, wherein said second snubber capacitor and said second snubber diode are coupled in series with each other to form a series circuit, wherein said series circuit is connected in parallel with said second output rectifier diode so as to allow said second snubber diode to have a reverse polarity to said second output rectifier diode, said second snubber transformer having a first winding interposed between a connection point of said first and second output rectifier diodes and one end of said second snubber capacitor, and said second snubber rectifier element having one end connected to one end of a second winding of said second snubber transformer, and said snubber inductor having one end coupled to the output side of said smoothing circuit and the other end coupled to said first and second snubber circuits to form a one-way discharging path for said first and second capacitors, and further comprising a voltage power source connected to respective other ends of said first and second snubber rectifier elements and respective other ends of said second windings provided in said first and second snubber transformers.

22. A switching power supply comprising:

a transformer having an input winding, an output winding, and a center tap provided in said output winding;

a switching circuit connected to said input winding of said transformer and switching a DC input voltage supplied to said input winding;

an output rectifier circuit including a first output rectifier diode having one end connected to one end of said transformer, and a second output rectifier diode having one end connected to the other end of said transformer, said one end of said second output rectifier diode having the same polarity as that of said one end of said first output rectifier diode, wherein the other ends of said first and second output rectifier diodes each having the same polarity are connected to each other;

an output smoothing circuit having an input side connected to a connection point between said first and second output rectifier diodes and said center tap of said transformer, and an output side connected to a pair of output terminals; and a snubber circuit comprising a first snubber circuit, a second snubber circuit, and a snubber inductor, said first snubber circuit including a first snubber capacitor, a first snubber diode and a first zener diode, wherein said first snubber capacitor and said first snubber diode are coupled in series with each other to form a series circuit, wherein said series circuit is connected in parallel with said first output rectifier diode so as to allow said first snubber diode to have a reverse polarity to said first output rectifier diode, said first zener diode being interposed between a connection point of said First and second output rectifier diodes and one end of said first snubber capacitor, said second snubber circuit including a second snubber capacitor, a second snubber diode and a second zener diode, wherein said second snubber capacitor and said second snubber diode are coupled in series with each other to form a series circuit, wherein said series circuit is connected in parallel with said second output rectifier diode so as to allow said second snubber diode to have a reverse polarity to said second output rectifier diode, said second zener diode being interposed between a connection point of said first and second output rectifier diodes and one end of said second snubber capacitor, and said snubber inductor having one end coupled to the output side of said smoothing circuit and the other end coupled to said first and second snubber circuits to form a one-way discharging path for said first and second capacitors.

* * * * *